United States Patent
Ida et al.

(10) Patent No.: US 12,208,328 B2
(45) Date of Patent: Jan. 28, 2025

(54) MACHINE LEARNING SYSTEM, INFORMATION TERMINAL, INFORMATION PROCESSING DEVICE, INFORMATION PROCESSING METHOD, PROGRAM, LEARNED MODEL, AND METHOD FOR GENERATING LEARNED MODEL

(71) Applicant: NEC Corporation, Tokyo (JP)

(72) Inventors: Kenichiro Ida, Tokyo (JP); Hiroshi Kitajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 644 days.

(21) Appl. No.: 17/437,946

(22) PCT Filed: Mar. 18, 2019

(86) PCT No.: PCT/JP2019/011193
§ 371 (c)(1),
(2) Date: Sep. 10, 2021

(87) PCT Pub. No.: WO2020/188701
PCT Pub. Date: Sep. 24, 2020

(65) Prior Publication Data
US 2022/0168640 A1   Jun. 2, 2022

(51) Int. Cl.
*A63F 13/533* (2014.01)
*A63F 13/67* (2014.01)
*G06N 20/20* (2019.01)

(52) U.S. Cl.
CPC ............ *A63F 13/533* (2014.09); *A63F 13/67* (2014.09); *G06N 20/20* (2019.01)

(58) Field of Classification Search
CPC ........ A63F 13/353; A63F 13/67; A63F 13/35; G06N 20/20; G06N 3/045; G06N 3/084; G06N 5/022; G06T 7/00
See application file for complete search history.

(56) References Cited

U.S. PATENT DOCUMENTS

| | | | | |
|---|---|---|---|---|
| 2005/0134685 A1* | 6/2005 | Egnal | .................... | H04N 7/181 348/157 |
| 2010/0009700 A1* | 1/2010 | Camp, Jr. | .......... | H04N 1/00244 455/456.6 |
| 2015/0036919 A1* | 2/2015 | Bourdev | ................ | G06V 20/35 382/156 |
| 2017/0085774 A1* | 3/2017 | Majumdar | .......... | G06F 18/2433 |
| 2018/0181885 A1 | 6/2018 | Higo et al. | | |

FOREIGN PATENT DOCUMENTS

| | | |
|---|---|---|
| JP | 2016-099668 A | 5/2016 |
| JP | 2018-106662 A | 7/2018 |
| JP | 2018-531543 A | 10/2018 |

OTHER PUBLICATIONS

International Search Report for PCT Application No. PCT/JP2019/011193, mailed on Jun. 11, 2019.
Luis von Ahn et al., "Labeling Images with a Computer Game", Proceedings of the SIGCHI Conference on Human Factors in Computing Systems, ACM, Apr. 2004.

* cited by examiner

*Primary Examiner* — David L Lewis
*Assistant Examiner* — Shauna-Kay Hall
(74) *Attorney, Agent, or Firm* — Sughrue Mion, PLLC

(57) ABSTRACT

A plurality of information terminals present response information for machine learning. Explanatory information for the response information is input to the plurality of information terminals by a user. A server acquires the explanatory information and the response information.

12 Claims, 27 Drawing Sheets

FIG. 7

| ORDER ID | REQUEST SOURCE | REQUEST DATE | DELIVERY DEADLINE | DELIVERY INFORMATION | DELIVERY DATE | ORDER LEARNING ID | ORDER FEE ID | SERVICE ID |
|---|---|---|---|---|---|---|---|---|
| | | | | | | | | |

FIG. 8

| ORDER LEARNING ID | REFERENCE MODEL SETTING | REFERENCE DATA SET | ORDER CLASS SETTING | ORDER DATA COLLECTION CONDITION |
|---|---|---|---|---|
| | | | | |

FIG. 9

| ORDER FEE ID | RECOGNITION RATE UNIT PRICE | DATA NUMBER UNIT PRICE | USER NUMBER UNIT PRICE | BATTLE CHARACTER ADDITION | PARAMETER UNIT PRICE | REWARD ADDITION |
|---|---|---|---|---|---|---|
| | | | | | | |

FIG. 10

| SERVICE ID | GAME_DATA COLLECTION CONDITION | SETTING CLASS | GAME ID | EVENT ID | BATTLE CHARACTER ID | REWARD ID | RELATED SERVER |
|---|---|---|---|---|---|---|---|
| | | | | | | | |

FIG. 11

| SERVICE ID | LEARNING_DATA COLLECTION CONDITION | SETTING CLASS | REFERENCE MODEL INFORMATION | REFERENCE DATA SET | RELATED SERVER |
|---|---|---|---|---|---|
| | | | | | |

FIG. 12

| SERVICE ID | GAME STATUS | FIRST CLASS GAME STATUS | SECOND CLASS GAME STATUS | THIRD CLASS GAME STATUS | GAME REPORT SETTING |
|---|---|---|---|---|---|
| | | | | | |

FIG. 13

| SERVICE ID | COLLECTION STATUS | FIRST CLASS COLLECTION STATUS | SECOND CLASS COLLECTION STATUS | THIRD CLASS COLLECTION STATUS | COLLECTION REPORT SETTING |
|---|---|---|---|---|---|
| | | | | | |

FIG. 14

| SERVICE ID | ADDITIONAL LEARNING INFORMATION | FIRST CLASS DATA SET | SECOND CLASS DATA SET | THIRD CLASS DATA SET | ACQUISITION DATE/TIME |
|---|---|---|---|---|---|
| | | | | | |

FIG. 15

| USER ID | DATE AND TIME | SERVICE ID | MODEL INFORMATION | DATA SET | RECOGNITION INFORMATION | GAME ID | EVENT ID | BATTLE CHARACTER ID | REWARD ID |
|---|---|---|---|---|---|---|---|---|---|
| | | | | | | | | | |

FIG. 21

| SERVICE ID | RECOGNITION RATE IMPROVEMENT VALUE | RESPONSE VARIABLE | VARIABLE VALUE | ASSIGNING CONDITION | GAME OBJECT |
|---|---|---|---|---|---|
| XXXXXX | 5 | HIT POINTS OF OPPONENT | 0pt (WIN) | NONE | SR CARD (IMAGE CHARACTER) |
| | 4 | HIT POINTS OF OPPONENT | -300pt | DEFEAT OPPONENT | LEVEL UP |
| | | ONE'S OWN HIT POINTS | +100pt | DEFEAT OPPONENT | SR CARD (IMAGE CHARACTER) |
| | 3 | NONE | NONE | DEFEAT OPPONENT | SR CARD (IMAGE CHARACTER) |
| | 2 | HIT POINTS OF OPPONENT | -300pt | DEFEAT OPPONENT | RARE CARD |
| | 1 | HIT POINTS OF OPPONENT | -300pt | DEFEAT OPPONENT | NORMAL CARD |
| | -1 | HIT POINTS OF OPPONENT | -200pt | DEFEAT OPPONENT | NORMAL CARD |
| | -2 | HIT POINTS OF OPPONENT | -200pt | NONE | NONE |
| | -3 | HIT POINTS OF OPPONENT | -100pt | NONE | NONE |
| | -4 | HIT POINTS OF OPPONENT | +0pt (ATTACK MISTAKE) | NONE | NONE |
| | -5 | HIT POINTS OF OPPONENT | +100pt | NONE | FORFEIT 1 ITEM |
| | | ONE'S OWN HIT POINTS | -100pt | | |
| ... | ... | ... | ... | ... | ... |

| SERVICE ID | RECOGNITION RATE IMPROVEMENT VALUE | RECOGNITION IMPROVEMENT VALUE |
|---|---|---|
| XXXXXXX | 1.5% OR MORE | 5 |
| | 1.0%~1.5% | 4 |
| | 0.5%~0.9% | 3 |
| | 0.3%~0.5% | 2 |
| | 0%~0.2% | 1 |
| | -1.9%~0% | -1 |
| | -3.9%~-2.0% | -2 |
| | -5.9%~-4.0% | -3 |
| | -7.9%~-6.0% | -4 |
| | ~-8.0% | -5 |
| ... | ... | ... |

US 12,208,328 B2

MACHINE LEARNING SYSTEM, INFORMATION TERMINAL, INFORMATION PROCESSING DEVICE, INFORMATION PROCESSING METHOD, PROGRAM, LEARNED MODEL, AND METHOD FOR GENERATING LEARNED MODEL

This application is a National Stage Entry of PCT/JP2019/011193 filed on Mar. 18, 2019, the contents of all of which are incorporated herein by reference, in their entirety.

TECHNICAL FIELD

The present invention relates to a machine learning system, an information terminal, an information processing device, an information processing method, a program, a learned model, and a method for generating a learned model.

BACKGROUND ART

Recent years have seen the development of technology related to machine learning. For example, Patent Document 1 discloses the following in relation to image recognition.

An image recognition device evaluates an identification result of a learning evaluation image by a first discriminator, and selects an erroneous identification area as a small area that is difficult to identify by the first discriminator. Then, the image recognition device learns a second discriminator for identifying an area including a plurality of small areas including the selected erroneous identification region. Finally, the image recognition device integrates the identification result by the first discriminator and the identification result by the second discriminator to learn an integrated discriminator.

PRIOR ART DOCUMENTS

Patent Documents

[Patent Document 1] Japanese Unexamined Patent Application, First Publication No. 2016-99668

SUMMARY OF THE INVENTION

Problem to be Solved by the Invention

However, the classification accuracy of the learned model (discriminator in Patent Document 1) also depends on the data used for machine learning. Accordingly, it is desired to collect data used for machine learning more efficiently.

Therefore, the object of the present invention is to provide a machine learning system, an information terminal, an information processing device, an information processing method, a program, a learned model, and a method for generating a learned model that can collect data used for machine learning more efficiently.

Means for Solving the Problem

The present invention has been made to solve the above-mentioned problems, and in order to achieve the above-mentioned object, one example aspect of the present invention is a machine learning system wherein a first system includes: a presenting unit that presents response information for machine learning; an input unit to which explanatory information for the response information is input by a user; an acquisition unit that acquires the explanation information and the response information; an evaluation unit that evaluates a classification accuracy of the response information by the explanatory information, based on a data set of an input variable based on the explanatory information and an output variable based on the response information, and a predetermined learned model; a reward assigning unit that assigns to the user a reward in accordance with the evaluation; and a history generation unit that generates history information in which the response information, the evaluation result, and the reward are associated, and a second system includes: a model storage unit that stores a learned model in which machine learning has been performed based on at least one of the data set; and an execution unit that outputs the response information in response to the explanatory information been input, based on the learned model stored in the model storage unit.

One example aspect of the present invention is an information terminal including: a presenting unit that presents response information for machine learning; an input unit to which explanatory information for the response information is input by a user; and a reward assigning unit that assigns to the user a reward in accordance with an evaluation using the response information and the explanatory information.

One example aspect of the present invention is an information processing device including: an evaluation unit that performs an evaluation based on response information for machine learning, explanatory information for the response information, and a predetermined learned model, the explanatory information being input to an information terminal by the user, the evaluation being an evaluation of a classification accuracy of the response information by the explanatory information; and a history generation unit that generates history information in which the response information and the evaluation result are associated.

One example aspect of the present invention is an information processing device including: a transmission unit that transmits response information for machine learning to an information terminal; and a reward determination unit that determines a reward to be assigned to a user in accordance with an evaluation, the evaluation being based on the response information, explanatory information for the response information, and a predetermined learned model, the explanatory information being input to the information terminal from the user, the evaluation being an evaluation of a classification accuracy of the response information by explanatory information.

One example aspect of the present invention is an information processing device including: an execution unit that reads from a model storage unit a learned model in which machine learning has been performed based on at least one of a data set of an input variable based on response information for machine learning and an input variable based on explanatory information for the response information, the response information being presented to an information terminal, the explanatory information being input to the information terminal by a user, the execution unit outputting the response information in response to the explanatory information being input, based on the learned model.

One example aspect of the present invention is an information processing method including: presenting response information for machine learning; explanatory information for the response information being input by a user; and assigning to the user a reward in accordance with an evaluation using the response information and the explanatory information.

One example aspect of the present invention is an information processing method including: acquiring response information for machine learning and explanatory information for the response information that is input to the information terminal by a user; evaluating a classification accuracy of the response information by the explanatory information on the basis of a data set of an input variable based on the explanatory information and an output variable based on the response information, and a predetermined learned model; and generating history information in which the response information and the evaluation result are associated.

One example aspect of the present invention is an information processing method including: transmitting response information for machine learning to an information terminal; and determining a reward to be assigned to a user in accordance with an evaluation, the evaluation being based on the response information, explanatory information for the response information, and a predetermined learned model, the explanatory information being input to the information terminal from the user, the evaluation being an evaluation of a classification accuracy of the response information by explanatory information.

One example aspect of the present invention is an information processing method including: reading from a model storage unit a learned model in which machine learning has been performed based on at least one of a data set of an input variable based on response information for machine learning and an input variable based on explanatory information for the response information, the response information being presented to an information terminal, the explanatory information being input to the information terminal by a user; and outputting the response information in response to the explanatory information being input, based on the learned model.

One example aspect of the present invention is a program for causing a computer of an information terminal to execute: a presenting step of presenting response information for machine learning; an input step in which explanatory information for the response information is input by a user; and a reward assigning step of assigning to the user a reward in accordance with an evaluation using the response information and the explanatory information.

One example aspect of the present invention is a program for causing a computer of an information processing device to execute: an acquisition step of acquiring response information for machine learning and explanatory information for the response information that is input to the information terminal by a user; an evaluation step of evaluating a classification accuracy of the response information by the explanatory information on the basis of a data set of an input variable based on the explanatory information and an output variable based on the response information, and a predetermined learned model; and a history information generation step of generating history information in which the response information and the evaluation result are associated.

One example aspect of the present invention is a program for causing a computer of an information processing device to execute: a transmission step of transmitting response information for machine learning to an information terminal; and a reward determination step of determining a reward to be assigned to a user in accordance with an evaluation, the evaluation being based on the response information, explanatory information for the response information, and a predetermined learned model, the explanatory information being input to the information terminal from the user, the evaluation being an evaluation of a classification accuracy of the response information by explanatory information.

One example aspect of the present invention is a program for causing a computer of an information processing device to execute: an execution step of reading from a model storage unit a learned model in which machine learning has been performed based on at least one of a data set of an input variable based on response information for machine learning and an input variable based on explanatory information for the response information, the response information being presented to an information terminal, the explanatory information being input to the information terminal by a user, and outputting the response information in response to the explanatory information being input, based on the learned model.

One example aspect of the present invention is a learned model, wherein the learned model is a learned model in which machine learning has been performed based on at least one of a data set of an input variable based on response information for machine learning and an input variable based on explanatory information for the response information, the response information being presented to an information terminal, the explanatory information being input to the information terminal by a user, and the learned model outputs the response information in response to the explanatory information being input.

One example aspect of the present invention is a method for generating a learned model, including acquiring at least one of a data set of an input variable based on response information for machine learning and an input variable based on explanatory information for the response information, the response information being presented to an information terminal, the explanatory information being input to the information terminal by a user; and generating a learned model by performing machine learning based on the at least one of the data set.

Effect of Invention

According to the present invention, data used for machine learning can be collected more efficiently.

BRIEF DESCRIPTION OF THE DRAWINGS

FIG. 7 is a schematic diagram showing an example of an order table according to the present example embodiment.

FIG. 8 is a schematic diagram showing an example of an order learning table according to the present example embodiment.

FIG. 9 is a schematic diagram showing an example of an order fee table according to the present example embodiment.

FIG. 10 is a schematic diagram showing an example of a game setting table according to the present example embodiment.

FIG. 11 is a schematic diagram showing an example of a learning setting table according to the present example embodiment.

FIG. 12 is a schematic diagram showing an example of a game status table according to the present example embodiment.

FIG. 13 is a schematic view showing an example of a collection status table according to the present example embodiment.

FIG. 14 is a schematic view showing an example of a collection management table according to the present example embodiment.

FIG. 15 is a schematic diagram showing an example of a service log according to the present example embodiment.

FIG. 21 is a schematic diagram showing an example of a reward selection table according to the present example embodiment.

EXAMPLE EMBODIMENT

Hereinbelow, an example embodiment of the present invention will be described in detail with reference to the drawings.

<Screen Flow>

Figure 1:
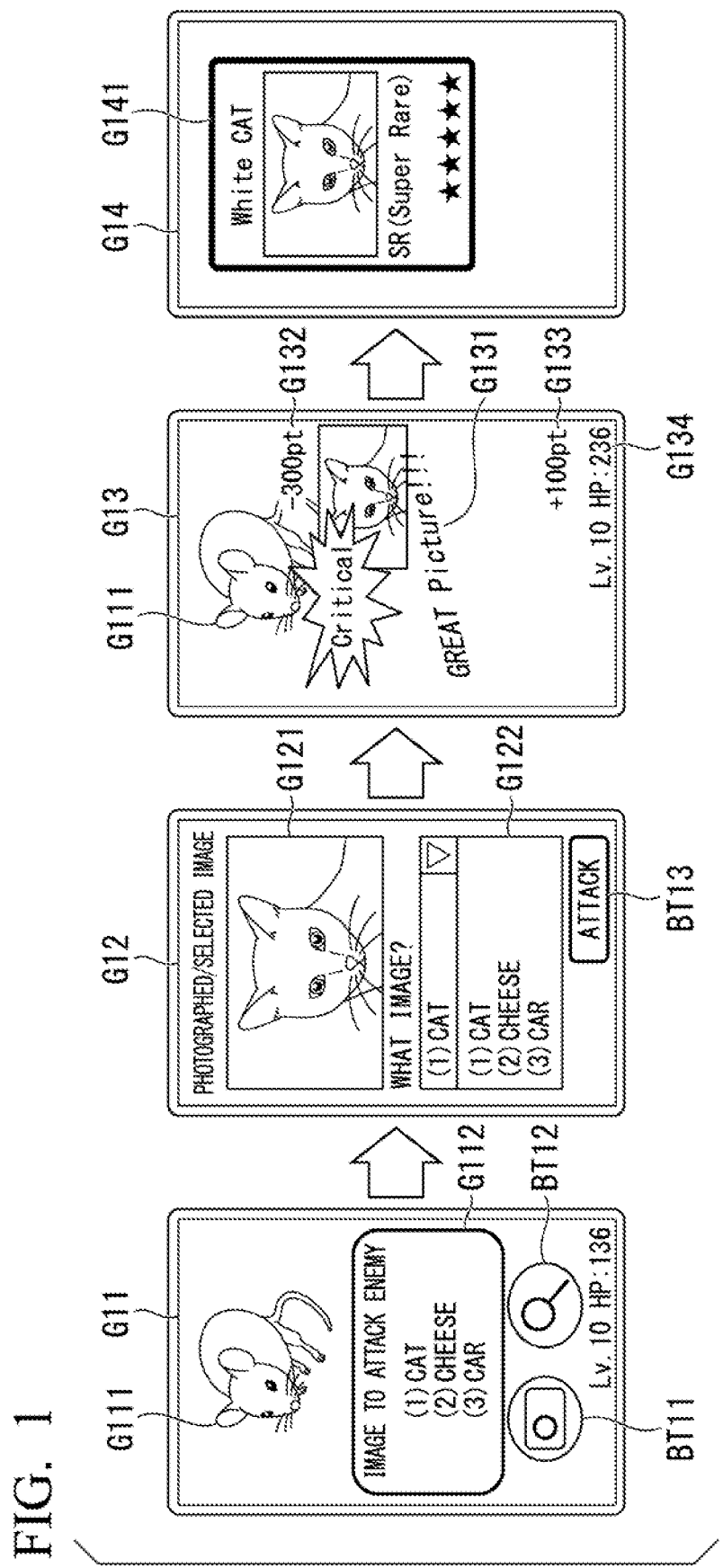
FIG. 1 is a schematic diagram showing an example of the screen flow according to an example embodiment of the present invention.

FIG. 1 is a schematic diagram showing an example of the screen flow according to an example embodiment of the present invention.

Figure 2:
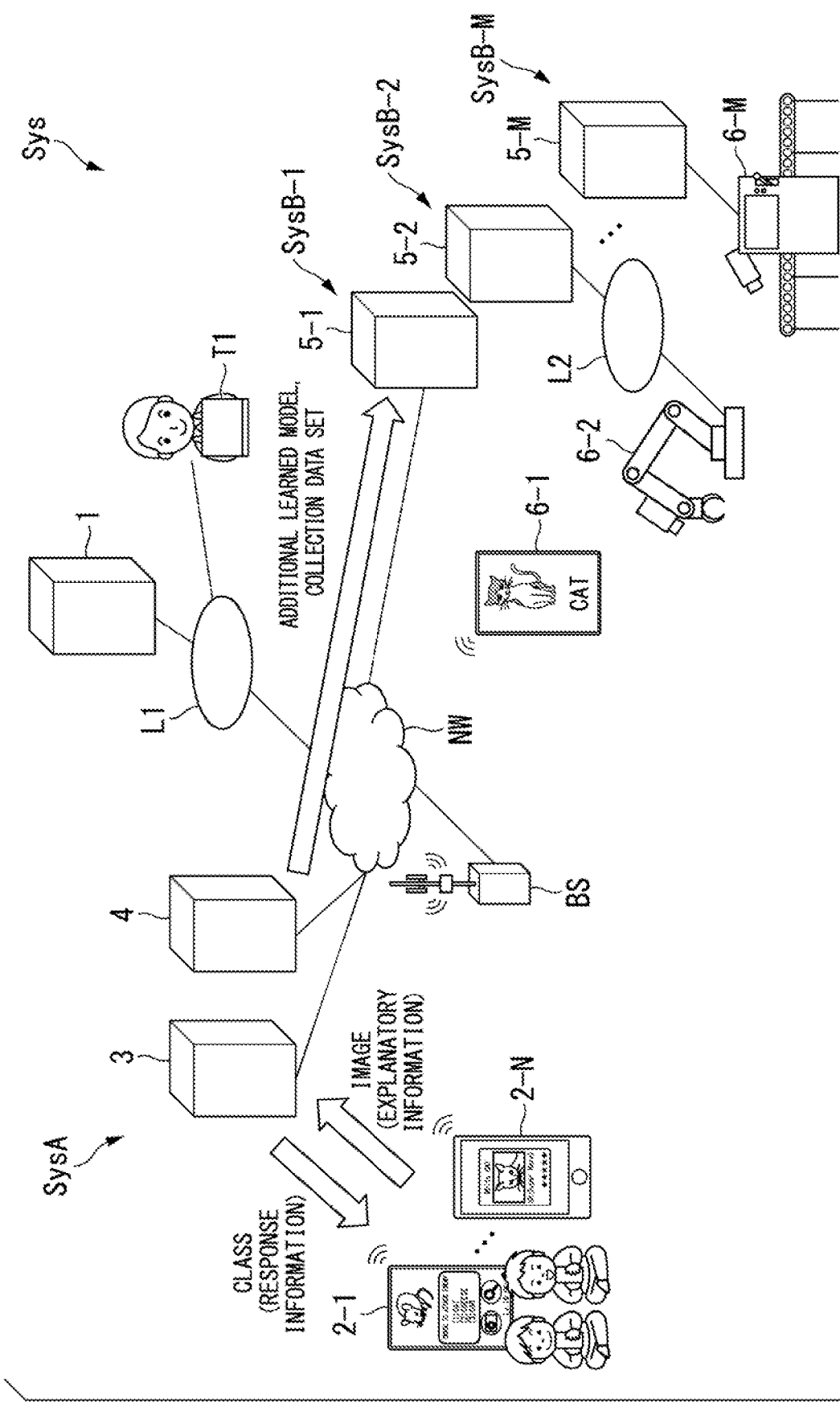
FIG. 2 is a schematic diagram showing a configuration example of a machine learning system according to the present example embodiment.

This figure is the screen flow displayed by mobile terminals 2-1 to 2-N of FIG. 2 (each is also referred to as "mobile terminal 2", being an example of an "information terminal"). This screen flow is displayed on the display of the mobile terminal 2 by a game mobile application (also referred to as a "game app") installed on the mobile terminal 2.

The game app is a battle-style game app. In such a battle-style game, an event occurs, and in each event, a battle between game characters occurs.

A battle character G111 is displayed on a screen G11. The battle character G111 is a character that plays against a game character (also referred to as an "operation character") operated by the user.

In an area G112, cat, cheese, and car are displayed as classes of the image (an example of "response information") that attacks the battle character G111. Class here means information for classifying (including identifying) an image, and is, for example, the name of the subject (an example of an "object") depicted in the image. That is, the screen G11 indicates that the user should provide an image of a cat, cheese, or a car in order to attack the battle character G111.

Figure 36:
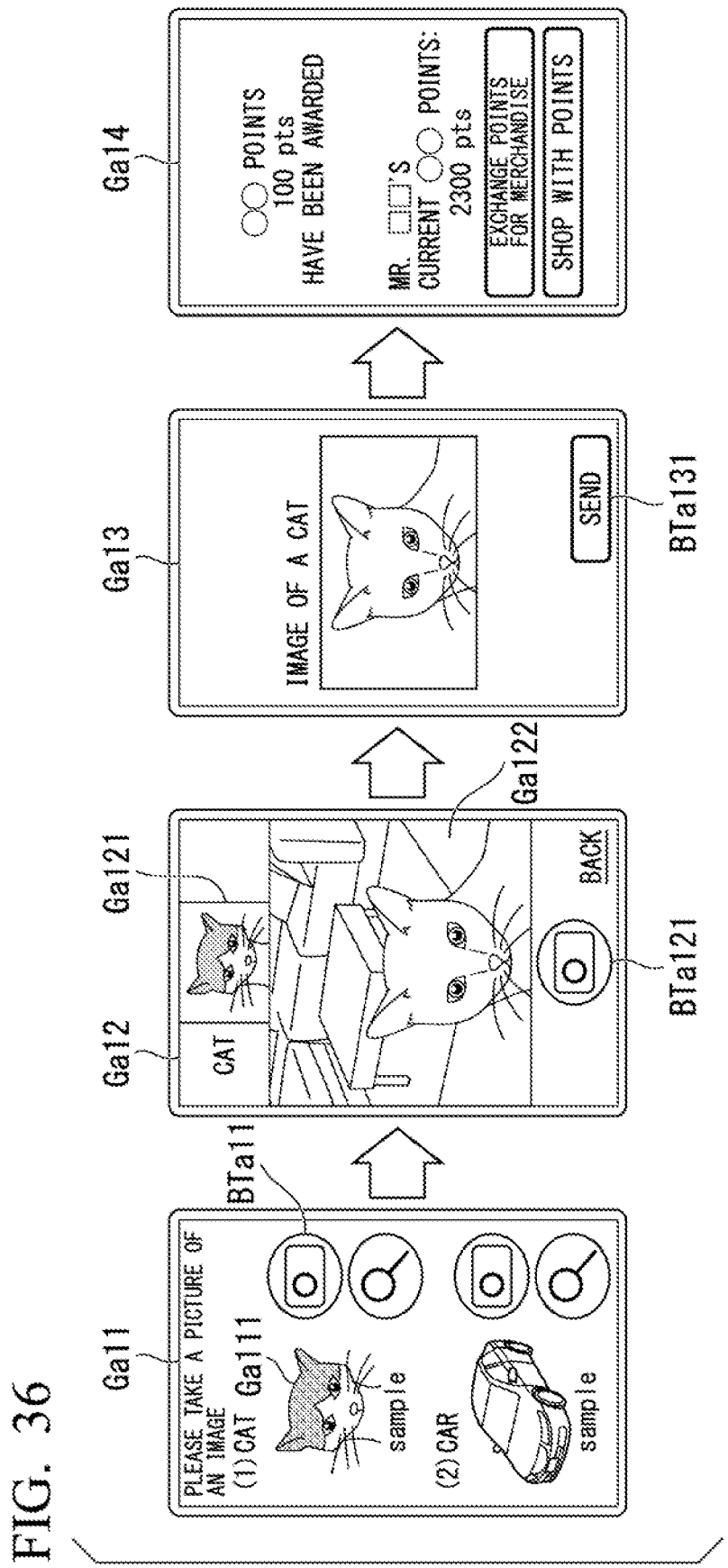
FIG. 36 is a schematic diagram showing another example of the screen flow according to the present example embodiment.

When a button BT11 is touched by the user, the mobile terminal 2 activates the camera and displays a screen on which a photograph can be taken (for example, the screen Ga12 in FIG. 36). On this screen, the user can shoot a still image or a moving image by tapping (touching) the shooting button.

When a button BT12 is touched by the user, the mobile terminal 2 displays a screen (not shown) in which a file in a folder on the mobile terminal 2 can be selected. On this screen, the user can select an image file. After the user has taken a picture or after the user has selected a file, the mobile terminal 2 displays a screen G12.

An image G121 (an example of "explanatory information") is displayed on the screen G12. The image G121 is an image taken by the user or an image of an image file selected by the user.

In a pull-down menu G122, cat, cheese, and car are displayed as candidates for the class of image G121. The user can use the pull-down menu G122 to select any one of cat, cheese, and car. That is, the mobile terminal 2 uses the pull-down menu G122 to allow the user to select a class among the classes presented in the screen G11. The class selected by the user is also called a confirmation class.

A button BT13 is a button that causes the operation character to attack the battle character G111 using the image G121 and the confirmation class. When the button BT13 is touched by the user, the mobile terminal 2 displays a screen G13.

On the screen G13, the battle character G111 is being attacked by the operation character. An image G131 is an image indicating, as an evaluation (also referred to as "recognition evaluation") of the image G121, a high evaluation of the image ("GREAT Picture"). The recognition evaluation is an evaluation of the classification accuracy of the class by the image G121. For example, in the recognition evaluation, when the recognition rate of the image by the learned model (also referred to as "model recognition rate") improves by machine learning being performed using this image G121 and the confirmation class, the evaluation becomes high. On the other hand, in the recognition evaluation, when the model recognition rate decreases, the evaluation becomes low. Details of recognition evaluation will be described later (see FIG. 26).

An image G132 shows that 300 points have been deducted from the hit points (an example of a "reward" or "variable in the game") of the battle character G111. Hit points are data in which, when the value thereof becomes zero, a character is defeated (has lost). On the other hand, the image G133 shows that 100 points have been added to the hit points of the operation character. For example, in an image G134, the hit points show that 100 points has been added to the 136 points in the screen G11 to become 236 points.

In this way, the mobile terminal 2 increases or decreases the hit points of the battle character G111 or the operation character according to the recognition evaluation of the image G121 provided by the user (an example of "update of variable in the game"). By providing an image, the user can defeat the battle character G111 and win the battle. When the battle character G111 has been defeated, the mobile terminal 2 displays a screen G14.

On the screen G12, a card G141 (an example of a "reward" or "game object") assigned to the user as a result of winning the battle is displayed. This card G141 is a "super rare" (also referred to as "SR") card having a high rarity value, and is assigned when the evaluation is high in the recognition evaluation. In the game app, the card is used for operation characters, items, generating special effects, updating of variables in the game, and the like.

As described above, the mobile terminal 2 displays the class for machine learning on the screen G11 (area G112). The image G121 for the presented class is input by the user with the mobile terminal 2. The mobile terminal 2 assigns the user a reward (increase/decrease in hit points, card) according to the class (confirmation class selected in the pull-down menu G122) and the image G121.

Thereby, the mobile terminal 2 can collect from the user the data set of the class and the image G121 as data used for machine learning. Since the user can provide an image with a simple operation after designating the class, the mobile terminal 2 can efficiently collect data used for machine learning. In addition, since the user is assigned a reward according to the recognition evaluation, the user provides an image whose evaluation is high in the recognition evaluation. In this case, the mobile terminal 2 can collect an image having a high model recognition rate as data used for machine learning.

The game app is executed on a general-purpose operating system (also referred to as "OS") installed on a smartphone or the like. The game app is downloaded via the Internet from an application store that distributes mobile applications (also referred to as "apps"). The application store is a download distribution platform that supports apps. That is, the game app can be operated by the general OS of the mobile terminal, and since the application store is distributed, it can be widely used by general users. However, the game app may also be downloaded from a particular website or data folder, or may be downloaded via a local network or personal computer.

<Machine Learning System>

FIG. 2 is a schematic diagram showing a configuration example of a machine learning system Sys according to the present example embodiment.

The machine learning system Sys is constituted by including a data collection system SysA (an example of the "first system") and a plurality of artificial intelligence systems SysB-1 to SysB-M (an example of the "second system". Each of them is referred to as an "artificial intelligence system SysB".).

The data collection system SysA includes a management server 1, mobile terminals 2-1 to 2-N, a game server 3, and a learning server 4. The management server 1 and a terminal T1 are connected via a local network area work L1. The management server 1, the game server 3, and the learning server 4 are connected via the local area network L1 and the Internet NW. The game server 3 and the learning server 4 are connected via the Internet NW. The mobile terminal 2 and the game server 3 are connected via the Internet NW and a base station device BS.

The artificial intelligence system SysB-m includes an artificial intelligence server 5-$m$ (also referred to as "artificial intelligence server 5") and a control device 6-$m$ (also referred to as "control device 6") (m=1 to M). The artificial intelligence system SysB is a system that provides services using a learned model of the result of machine learning. The control device 6-1 is a mobile terminal, and displays a class for an image input by the user. The control device 6-2 is a robot arm, and controls the operation of an arm according to the captured image of the object to be transported. The control device 6-M is a quality control device, and determines whether the inspection object is normal or abnormal in accordance with the captured image of the inspection object.

The artificial intelligence server 5-1 and the control device 6-1 are connected via the Internet NW and the base station device BS. The artificial intelligence server 5-2 and the control device 6-2 are connected via the local area network L2. The artificial intelligence server 5-M and the control device 6-M are directly connected. Note that the machine learning system Sys may include one artificial intelligence system SysB instead of including a plurality of artificial intelligence systems SysB, and the artificial intelligence system SysB may be a single device (housing).

In the machine learning system Sys, the game server 3 transmits a class for machine learning to each mobile terminal 2. Each mobile terminal 2 displays a class to the user. Each mobile terminal 2 receives an input of an image for the class from the user. Each mobile terminal 2 transmits the data set of the input class and image to the game server 3. The learning server 4 acquires the data set from each mobile terminal 2 via the game server 3. The learning server 4 performs recognition evaluation based on the acquired data set and a predetermined learned model. The game server 3 assigns the user a reward in accordance with the recognition evaluation.

The learning server 4 collects a plurality of data sets (also referred to as "collection data sets") by repeating the above. Each artificial intelligence server 5 stores a learned model (also referred to as an "additional learned model") in which machine learning has been performed based on at least one of the collection data sets. Each artificial intelligence server 5 outputs a class when an image is input on the basis of the additional learned model.

Thereby, the machine learning system Sys can collect data sets of classes and images as data used for machine learning from a large number of users. The machine learning system Sys can acquire many data sets or various data sets as compared with the case of acquiring data sets from a small number of users, and can collect data used for machine learning more efficiently.

<Processing with Machine Learning System>

Figure 3:
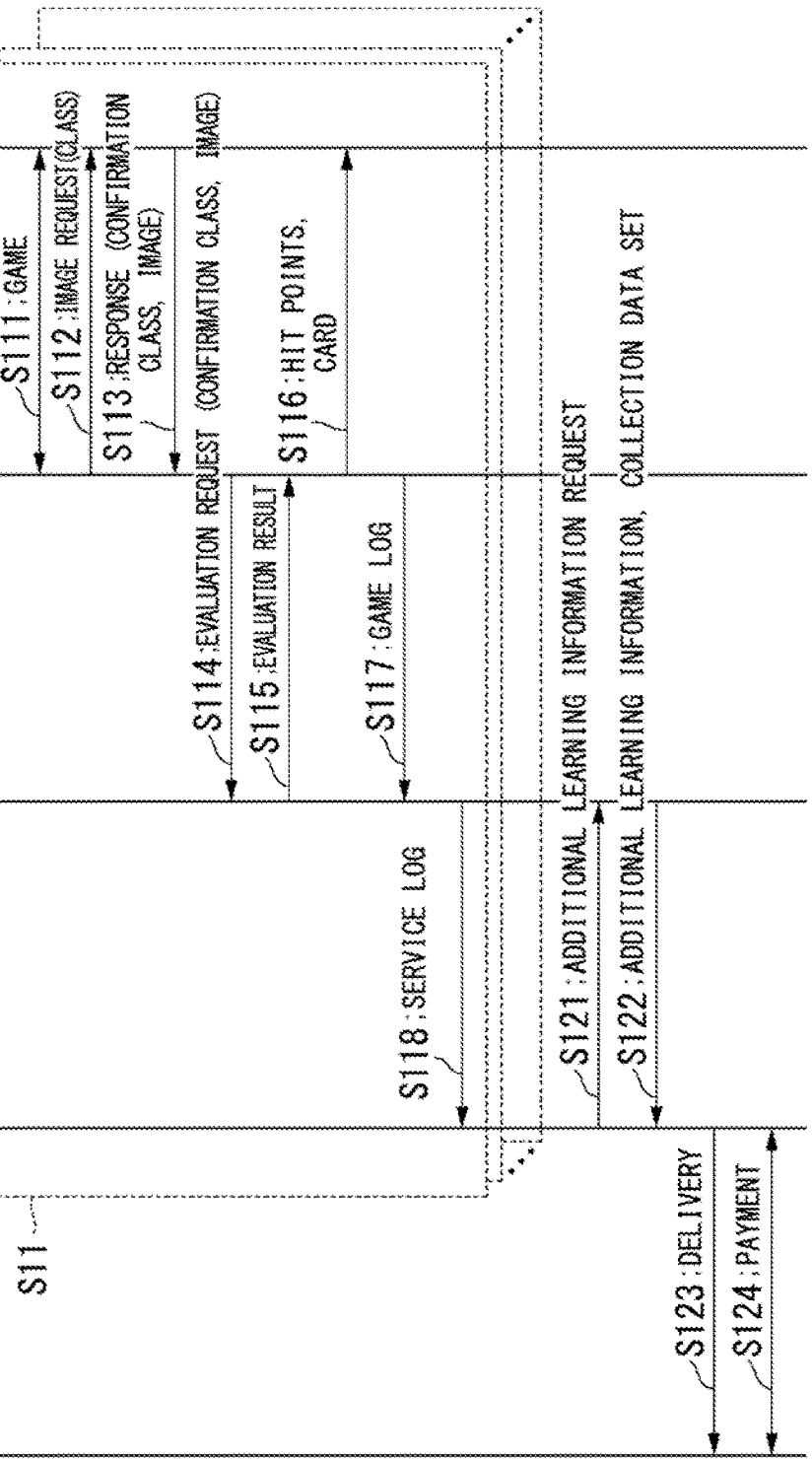
FIG. 3 is a sequence diagram showing an example of the processing flow in the machine learning system according to the present example embodiment.

FIG. 3 is a sequence diagram showing an example of the processing flow in the machine learning system Sys according to the present example embodiment. The sequence is not limited thereto, and the order of each process may be changed, or the plurality of processes may be performed in parallel.

(Step S101) Order information is input to the terminal T1 from the manager. The order information is information for requesting the collection of data (a data set of class and image) used for machine learning. The order information includes request source information indicating the request source. The request source is the requesting entity from which the manager has been requested to collect data, for example, a company that provides the artificial intelligence system SysB. The terminal T1 transmits the order information to the management server 1.

(Step S102) The artificial intelligence server 5 transmits the learned model setting (also referred to as the "reference model setting") and a reference data set used in the artificial intelligence system SysB to the management server 1.

Here, the reference model setting includes a machine learning program prior to collection of the data set. A machine learning program is an application program that generates a learned model by performing machine learning using a data set. The machine learning program is, for example, a CNN (convolutional neural network) program.

The reference data set is a data set used for recognition evaluation, and is a set of an image and the class of the subject of the image (the correct class in terms of classification). For example, in the reference data set, the class of "cat" is correctly associated with a cat image.

Figure 4:
FIG. 4 is a schematic diagram showing an example of the service setting screen according to the present example embodiment.

(Step S103) The management server 1 generates a learning setting on the basis of the order information in Step S101, and the reference model setting and reference data set of Step S102. The learning setting is a setting for performing recognition evaluation, and is set using the service setting screen of the terminal T1 (FIG. 4). The learning setting includes a machine learning program and reference data set. The management server 1 transmits the generated learning setting to the learning server 4.

(Step S104) The management server 1 generates a game setting on the basis of the order information in Step S101 (refer to FIG. 4). The game setting is a setting for collecting data used for machine learning in the game application, and is set using the service setting screen (FIG. 4) of the terminal T1. The management server 1 transmits the game setting including the class to the game server 3.

(Step S111) The game server 3 and the mobile terminal 2 advance the game on the basis of a user operation.

(Step S112) The game server 3 refers to the game setting in Step S104 while the game is in progress. The game server 3 transmits an image request including the class of the game setting to the mobile terminal 2.

(Step S113) The mobile terminal 2 displays the class included in the image request in Step S112 (screen G11 in FIG. 1). The mobile terminal 2 acquires the image input by the user for the displayed class (screen G12). The mobile terminal 2 transmits a response including the data set of that class (confirmation class) and the acquired image to the game server 3.

(Step S114) The game server 3 transmits the data set included in the response of Step S113 to the learning server 4 as an evaluation request.

(Step S115) The learning server 4 refers to the evaluation request in Step S114 and performs recognition evaluation on the image of the data set. Here, the learning server 4 refers to the learning setting in Step S103, and performs recognition evaluation using the reference model setting and the reference data set of that learning setting. The learning server 4 transmits the evaluation result of the recognition evaluation to the game server 3.

(Step S116) The game server 3 determines a reward such as hit points and cards according to the evaluation result of Step S115. The game server 3 transmits the determined reward to the mobile terminal 2. The mobile terminal 2 assigns the received reward to the user who input the image in S113 (screens G13 and G14 in FIG. 1).

(Step S117) The game server 3 transmits the game log to the learning server 4. The game log is data collected by the game server 3 among the items of the service log of FIG. 15.

(Step S118) The learning server 4 generates a service log (FIG. 15) by adding the model recognition rate and the like calculated in the recognition evaluation in Step S115 to the game log in Step S117 as discrimination information. The learning server 4 transmits the service log to the management server 1.

The process S11 from Step S111 to Step S118 is performed a plurality of times for the same or other mobile terminal 2 (same or other user). For example, when collecting 1,000 data sets, the process S11 is performed at least 1,000 times.

(Step S121) When the management server 1 has satisfied the condition for requesting the collection data sets collected by the process S11 performed multiple times (also referred to as "learning information request condition"), the management server 1 transmits an additional learning information request to the learning server 4.

(Step S122) The learning server 4 performs machine learning on the learned model of the reference model setting using the collection data sets. As a result of this learning, the learning server 4 generates an additional learned model. This additional learned model is also referred to as "additional learning information". The learning server 4 transmits the additional learning information and the collection data sets to the management server 1.

(Step S123) The management server 1 delivers the additional learned model and the collection data sets received in Step S122 by transmitting them to the artificial intelligence server 5. In addition, this delivery may be performed manually. For example, a human may store the additional learned model or collection data sets in a storage medium, convey and copy the additional learned model or collection data sets from the storage medium to the artificial intelligence server 5.

(Step S124) The management server 1 generates billing information on the basis of the order information in Step S101, and the billing information is transmitted to the request source of the order information. The request source pays the billing information fee to complete the settlement.

The processing in the sequence diagram of FIG. 3 above is performed for each order. The machine learning system Sys can receive a plurality of orders from one or a plurality of request sources at the same time or at different times. The collection data sets are collected in units of order information (for each order ID).

<Service Setting Screen>

FIG. 4 is a schematic view showing an example of the service setting screen according to the present example embodiment.

The service setting screen G2 is composed of an order information display G21 and a setting information display G22. The order information display G21 is a display for causing the manager to refer to the order information. The setting information display G22 is a display for causing the manager to refer to and update the learning setting and the game setting.

Note that the service setting screen G2 is generated for each order (for each order ID input from the terminal T1) by the management server 1 and displayed by the application of the terminal T1.

The order information display G21 is composed of an order basic display G211, an order learning display G212, and an order fee display G213. The information ordered from the request source is displayed on the order information display G21.

The basic order display G211 displays the order ID, request source, request date, delivery destination, delivery deadline, and delivery status. The order ID is an identifier that identifies the order, and is generated by the management server 1 for each order.

The order learning display G212 displays a reference model, a reference model setting, a reference data set, an order class setting, and an order data collection condition. The reference model is information indicating the name of the reference model and the type thereof. The order class setting is the ordered class setting. The class setting is a setting for selecting a class. The order data collection condition is the collection period to collect data, the number of cases, the recognition rate (model recognition rate), and the condition of reward, and is a setting that is ordered.

The fee (fee setting) is displayed on the order fee display G213. For example, the fee is a fee according to the improved recognition rate (model recognition rate), the total number of data sets (number of items of data), the number of users, the number of references, the battle character, the hit points, and the reward assigned. Based on these fee settings, the billing information described above is generated.

The setting information display G22 is composed of a game setting display G221, a learning setting display G222, and a reward setting display G223. The service ID is displayed in the title portion of the setting information display G22. The service ID is an identifier that identifies the service for each order, and is generated by the management server 1 for each order.

Game information, event information, and battle characters are displayed on the game setting display G221. The game information is a game ID that identifies the game app and the name of the game app. The event information is an event ID that identifies the event and the name of the event. The battle character is a battle character ID that identifies the battle character, and an image of the battle character. The setting of the game setting display G221 is updated (newly set or changed) when the manager clicks the button BT21 and inputs information.

Learning server information, a class setting, and a data collection condition are displayed in the learning setting display G222. The learning server information is identification information that identifies the learning server, and is a URI (Uniform Resource Identifier) or the server name of the learning server. The order class setting and the order data setting are duplicated in the class setting and the data collection condition. The class setting and data collection condition can be updated by the manager by clicking the buttons BT22 and BT23, respectively.

In the learning setting display G222, selecting a class having a low model recognition rate automatically and selecting a class specified by the request source are displayed as class settings. The learning setting display G222 shows that, as classes with low model recognition rates, "cheese" and "car" are selected in ascending order of model recognition rate, and "cat" is selected as the class specified by the request source. In this case, a priority ranking is applied in the order of the classes specified by the request source and the class with the lowest model recognition rate (the lower coming first), with "cat" set in first class, "cheese" set in second class, and "car" set in third class. The classes are displayed in this order in the area G112 and the pull-down menu G12 in FIG. 1.

The learning setting display G222 displays the conditions of the collection period, the number of cases, the recognition rate (model recognition rate), and the reward as data collection conditions. The condition of the number of cases is a condition based on the total number of collected data sets, and for example, the total number of collection data sets is within a threshold value (1,000 cases). That is, when the total number of collection data sets exceeds the threshold value, the collection is ended. The recognition rate condition is a condition based on the model recognition rate, and for example, the model recognition rate is within the threshold value (90%). That is, when the model recognition rate exceeds the threshold value, the collection is ended. The condition of the reward is a condition based on the reward, and for example, the number of Super Rare cards to be assigned is within the threshold value (1,000 cards). That is, when the number of Super Rare cards assigned exceeds the threshold value, the collection is ended.

The reward that has been selected is displayed as the reward setting in the reward setting display G223. In the reward setting display G223, the assigning of a super rare card, the deducting of 300 points from the battle character for hit points, and the adding of 100 points to the user's operation character are displayed.

The reward setting can be updated by the manager by clicking a button BT24. For example, the manager can select the type of game object. The game object is the object used in a game, for example, a card, a coin, an item, a character, a present, or the like. The manager can, in the case of a card, update the rarity of the card as the type of game object. In addition, with regard to variables in the game, the manager can update variables to be rewarded and the variable values thereof. Variables in the game include, for example, levels, abilities (attack power, defensive power, etc.), magic points, probability of critical hits, appearance probability of cards and special effects, team level, life, and the like.

When a button BT25 is clicked, the information displayed on the service setting screen G2 is set. For example, the information displayed in the order learning display G212 and the learning setting display G222 is set in the management server 1 and the learning server 4 as a learning setting. The information displayed in the game setting display G221 and the reward setting display G223 is set in the management server 1 and the game server 3 as a game setting.

The order data collection condition, fee setting, event information, battle character, data collection condition, or reward setting may be set for each class, or a plurality of contents and conditions may be set for each class.

<Service Management Screen>

Figure 5:
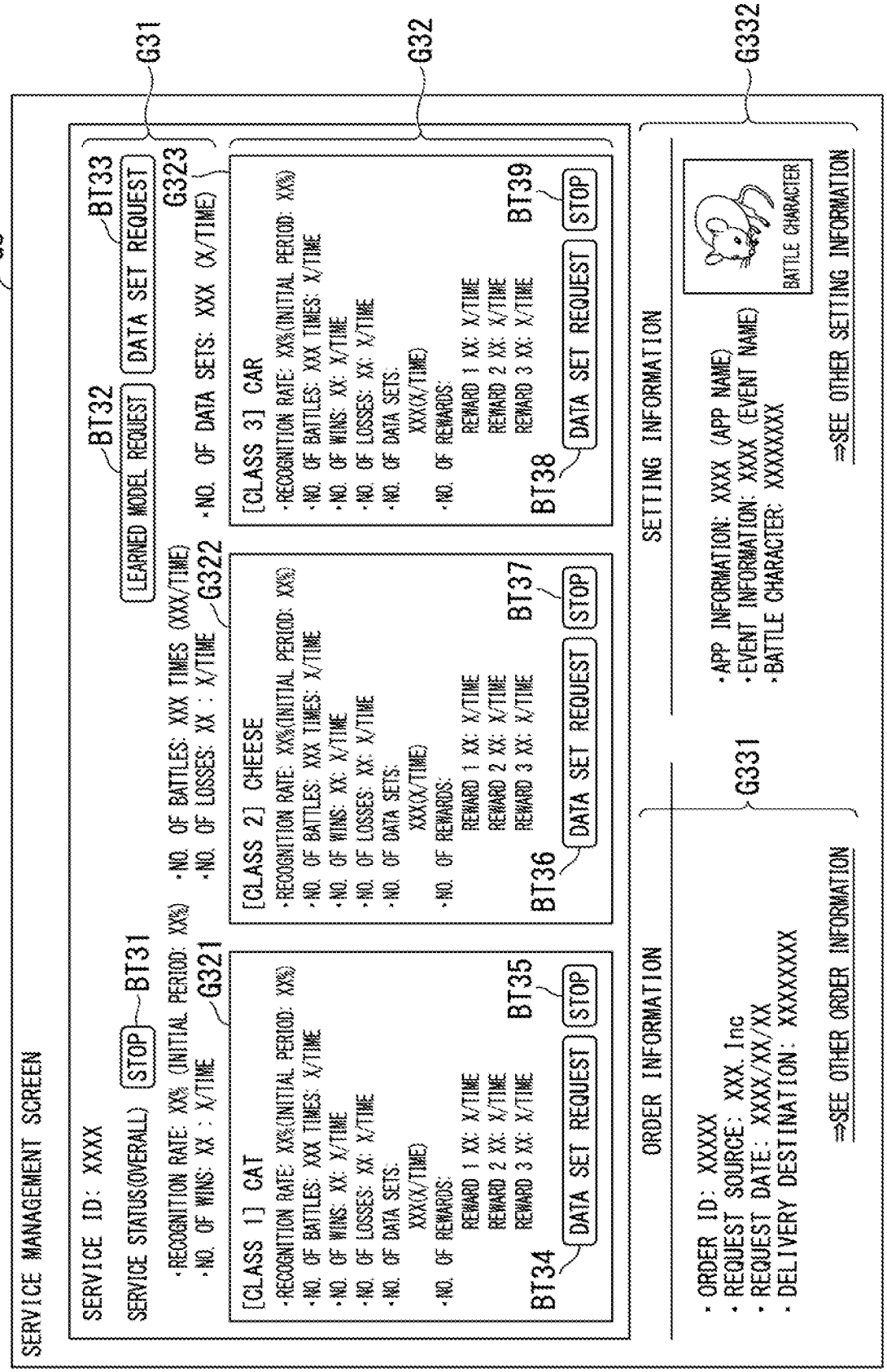
FIG. 5 is a schematic diagram showing an example of a service management screen according to the present example embodiment.

FIG. 5 is a schematic diagram showing an example of a service management screen G3 according to the present example embodiment.

The service management screen G3 is composed of a service status display G31, a class status display G32, an order basic display G331, and a game setting display G332. The service status display G31 and the class status display G32 are displays that causes the manager to refer to the game status information and the collection status information (also referred to as "service status information"). The class status display G32 is a display for referring to the service status information for each class, and the service status display G31 is a display for referring to the service status information of the entire service. Since each item of the order basic display G331 and the game setting display G332 is the same as each item of the order basic display G211 game setting display G221, descriptions thereof will be omitted. The service management screen is generated for each order (for each input order ID) by the management server 1 and displayed by an application of the terminal T1.

The service status display G31 displays the service ID, and the recognition rate, the number of battles, the number of successes, the number of failures, and the number of data sets as the service status (overall). The recognition rate is the average value of the model recognition rate for each class. The number of battles, the number of successes, the number of failures, and the number of data sets are total values for all classes (first class, second class, third class).

The number of battles is the number of times the set battle character and the operation character of each user have played against each other. The number of successes is the number of times the model recognition rate has increased in the acquired data set. The number of failures is the number of times the model recognition rate has decreased in the acquired data set. The number of data sets is the number of times the data set is acquired, and is the total value of the number of successes and the number of failures. The number of battles, the number of successes, the number of failures, and the number of data sets are also calculated for each predetermined time unit (for example, one hour) and displayed in the service status display G31.

When a button BT31 is clicked, the game server 3 and the learning server 4 stop the service for the displayed order. For example, the game server 3 deletes the event ID that has been set and prevents the battle character that has been set from appearing.

When the button BT32 or the button BT33 is clicked, the additional learning information request is transmitted to the learning server 4 (Step S121 in FIG. 3), and the additional learning information or the collection data sets are transmitted to the management server 1 (Step S122 in FIG. 3).

The service status display G31 is composed of a first-class status display G321, a second-class status display G322, and a third-class status display G323. The first-class status display G321, the second-class status display G322, and the third-class status display G323 display the usage status and data collection status of the first-class, second-class, and third-class games, respectively.

The service status display G31 displays the recognition rate (model recognition rate), the number of battles, the number of successes, the number of failures, the number of data sets, and the number of rewards for each class. The number of rewards is the number of times the reward has been assigned for each reward. When a button BT34 is clicked, an additional learning information request is transmitted to the learning server 4 (Step S121 in FIG. 3), and the first-class collection data set is transmitted to the management server 1 (Step S122 in FIG. 3). When a button BT35 is clicked, the game server 3 and the learning server 4 stop the service for the first class. For example, the game server 3 deletes the display of the first class as a class for machine learning (see FIG. 1). Buttons BT36 and BT37 have the same functions as buttons BT35 and BT36 for the second class, and buttons BT38 and BT39 have the same functions as the buttons BT35 and BT36 for the second class, respectively.

<Management Server Configuration>

Figure 6:
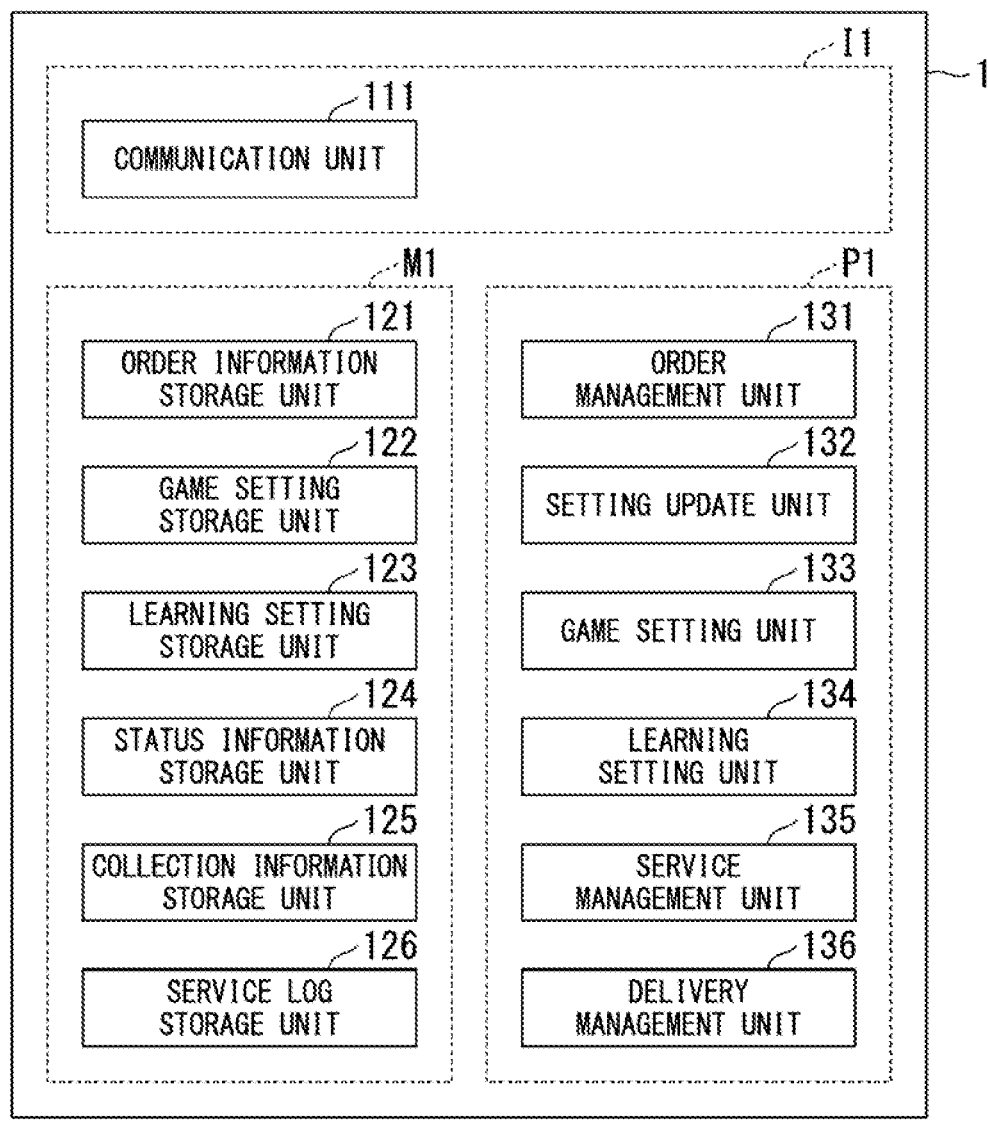
FIG. 6 is a schematic block diagram showing a configuration of the management server according to the present example embodiment.

FIG. 6 is a schematic block diagram showing the configuration of the management server 1 according to the present example embodiment.

The management server 1 configured by including an input/output unit I1, a storage unit M1, and a control unit P1.

The input/output unit I1 is configured by including a communication unit 111. The storage unit M1 is configured by including an order information storage unit I21, a game setting storage unit I22, a learning setting storage unit I23, a status information storage unit I24, a collection information storage unit I25, and a service log storage unit 126. The control unit P1 is configured by including an order management unit 131, a setting update unit 132, a game setting unit 133, a learning setting unit 134, a service management unit 135, and a delivery management unit 136.

<Data>

(Order Table, Order Learning Table, Order Fee Table: Order Information)

FIG. 7 is a schematic view showing an example of an order table according to the present example embodiment.

The order table is used to generate the basic order display G211 (FIG. 4). In the order table, the items of order ID, request source, request date, delivery deadline, delivery information, delivery date, order learning ID, order fee ID, and service ID are associated with each other. In the order table, the order ID serves as the primary key, and the basic order information among the order information is stored as a record.

Delivery information is information indicating the delivered item (additional learning information or collection data set) and the delivery destination. For example, the URI of the artificial intelligence server 5 is stored in the delivery destination. Further, when the manager or the like delivers the delivered product for an order of a certain order ID, the date is input to the delivery date of the record of the order ID. If there is no date in the delivery date, the delivery state is undelivered, and if there is no date in the delivery date, the delivery state is already delivered.

The order learning ID and the order fee ID are identifiers for associating with the order learning table and the order fee table, respectively, and are generated by the management server 1. The order learning ID and the order fee ID are identifiers for associating the order table with the order learning table and the order fee table, respectively, and are generated by the management server 1. The service ID associates the order table with the learning setting table, the game setting table, the status management table, and the collection management table.

FIG. 8 is a schematic view showing an example of an order learning table according to the present example embodiment.

The order learning table is used to generate the order fee display G213 (FIG. 4). In the order learning table, the items of order learning ID, reference model setting, reference data set, order class setting, and order data collection condition are associated with each other. In the order learning table, the order learning information among the order information is stored as a record, with the order learning ID serving as the primary key.

The URI of the storage destination of the reference model setting and the reference data set is stored in the reference model setting and the reference data set, respectively.

FIG. 9 is a schematic diagram showing an example of an order fee table according to the present example embodiment.

The order fee table is used for the generation of the order fee display G213 (FIG. 4). In the order learning table, each item of order fee ID, recognition rate unit price, data number unit price, user number unit price, battle character addition, parameter unit price, and reward addition are associated with each other. In the order fee table, the order fee information among the order information is stored as a record, with the order fee ID serving as the primary key.

Each item of the order learning table is the unit price of the fee setting displayed in the order fee display G213. As the parameter unit price, an example of the unit price for hit points is shown, but the unit price may be set for each variable in other games.

(Game Setting Table: Game Setting)

FIG. 10 is a schematic diagram showing an example of a game setting table according to the present example embodiment.

The game setting table is used for generation of the game setting display G221 and the learning setting display G222 (FIG. 4), and is updated with the contents displayed in the game setting display G221 and the learning setting display G222.

In the game setting table, the items of service ID, game_data collection condition, setting class, game ID, event ID, battle character ID, reward ID, and related server are associated with each other. In the game setting table, the service ID serves as the primary key, and the game settings are stored as records. The game_data collection condition is a condition set in the game server 3 among the data collection conditions. The game_data collection condition is a reward condition. The first class, the second class, and the third class (in the case of the example of FIG. 4, "cat", "cheese", and "car") are stored in the class setting. The reward ID is an identifier that identifies the reward, and the URI of the management server 1, the game server 3, and the learning server 4 is stored in the related server generated for each reward setting.

(Learning Setting Table: Learning Setting)

FIG. 11 is a schematic diagram showing an example of the learning setting table according to the present example embodiment.

The learning setting table is used to generate the learning setting display G222 (FIG. 4), and is updated with the contents displayed on the learning setting display G222.

In the learning setting table, the items of service ID, learning_data collection condition, setting class, reference learning setting, reference data set, and related server are associated with each other. In the learning setting table, the service ID serves as the primary key, and the learning setting is stored as a record.

The learning_data collection condition is a condition set in the learning server 4 among the data collection conditions. The learning_data collection condition is a condition of the collection period, number of cases, and model recognition rate. The URI of the management server 1, the game server 3, and the learning server 4 is stored in the related server.

(Game Status Table, Collection Status Table: Status Information)

FIG. 12 is a schematic diagram showing an example of a game status table according to the present example embodiment.

The game status table is used for the generation of the service management screen G3 (FIG. 5).

In the game status table, the items of service ID, game status, first class game status, second class game status, third class game status, and game report setting are associated with each other. In the game status table, the service ID serves as the primary key, and the game status information is stored as a record.

The game status stores the number of battles, the number of successes, the number of failures, and the temporal changes thereof as the service status (overall). In the first-class game situation, the second-class game situation, and the third-class game situation, the number of battles, the number of successes, the number of failures, and the temporal changes thereof are stored for the first class, the second class, and the third class, respectively. The game report setting is a setting for reporting game status information, and stores the URI and report timing of the report destination (management server 1).

FIG. 13 is a schematic diagram showing an example of a collection status table according to the present example embodiment.

The collection status table is used for generation of the service management screen G3 (FIG. 5).

In the collection status table, the items of service ID, collection status, first class collection status, second class collection status, third class collection status, and collection report setting are associated with each other. In the collection status table, the service ID serves as the primary key, and the collection status information is stored as a record.

The collection status stores the model recognition rate and the number of data sets and the temporal changes thereof as the service status (overall). In the first-class collection status, the second-class collection status, and the third-class collection status, the model recognition rate, the number of data sets, and the temporal changes thereof are stored for the first class, the second class, and the third class, respectively. The collection report setting is a setting for reporting collection status information, with the URI of the report destination (management server 1) and the report timing being stored.

(Collection Management Table: Additional Learning Information, Collection Data Sets)

FIG. 14 is a schematic diagram showing an example of the collection management table according to the present example embodiment.

The collection management table is used for management of additional learning information and collection data sets.

In the collection status table, the items of service ID, additional learning information, first class data set, second class data set, third class data set, and acquisition date/time are associated with each other. In the collection management table, the collection information is stored as a record with the service ID serving as the primary key. The URI of the additional learning information is stored in the additional learning information. The URIs of the first-class, second-class, and third-class collection data sets are stored in the first-class data set, the second-class data set, and the third-class data set, respectively.

(Service Log)

FIG. 15 is a schematic diagram showing an example of a service log according to the present example embodiment.

The service log is configured by including the user ID, date and time, service ID, model information, confirmation class, data set, recognition information, game ID, event ID, battle character ID, and reward ID. The service log is the history when recognition evaluation is performed.

The user ID is an identifier that identifies the user. The user ID is the user ID in the service that collects data, and may be the user ID that identifies the user in the game. The model information is the identification information of the learned model used for the recognition evaluation. The recognition information is a model recognition rate, a recognition rate improvement value, and a recognition evaluation value. The data set is the data set of a class (confirmation class) and an image input from the user.

The service log of FIG. 15 indicates that the data set of the class of "data set" and image is input by the user of "user ID" at the date and time of "date and time" with respect to the learning model indicating "model information" in the service of "service ID", and this data set has become the model recognition rate, recognition rate improvement value, and recognition evaluation value of "recognition information" in the recognition evaluation. In addition, this data set is input in a battle with the battle character of the "battle character ID" in the event of the "event ID" of the game of "game ID", and indicates the reward of "reward ID" is assigned to the user.

<Processing of Management Server 1>

Figure 16:
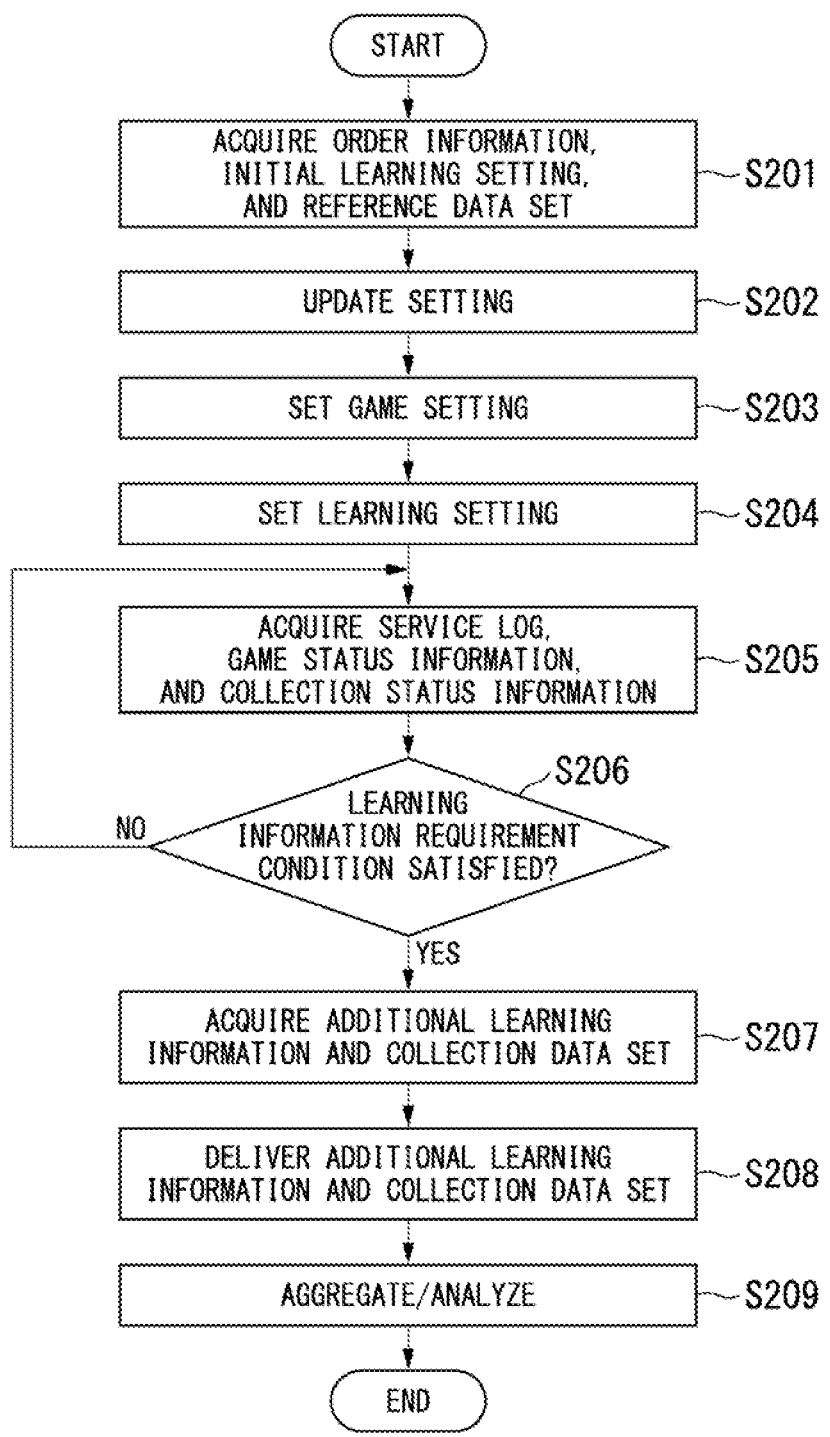
FIG. 16 is a flow chart showing an example of the process of the management server according to the present example embodiment.

FIG. 16 is a flowchart showing an example of processing of the management server 1 according to the present example embodiment.

Hereinbelow, the process of each part of the management server 1 will be described with reference to FIG. 6.

Note that each part of the management server 1 communicates with other devices via the communication unit 111.

(Step S201) The order management unit 131 acquires order information from the terminal T1. The order management unit 131 acquires the reference model setting and the reference data set from the artificial intelligence server 5. The order management unit 131 stores the order information in the order table, the order learning table, and the order fee table of the order information storage unit I21.

(Step S202) The setting update unit 132 generates a service setting screen G2 on the basis of the order information in Step S201 to be displayed in the terminal T1. The setting update unit 132 updates the game setting and the learning setting based on input from the manager. Here, the setting update unit 132 determines, for example, a class having a low recognition rate when "automatic" is selected in the class setting.

(Step S203) The game setting unit 133 stores the game setting updated in step S202 in the game setting table of the game setting storage unit I22, and transmits the game setting to the game server 3. (Step S204) The learning setting unit 134 stores the learning setting updated in step S202 in the learning setting table of the learning setting storage unit I23, and transmits the learning setting to the learning server 4.

(Step S205) The service management unit 135 acquires the service log from the learning server 4 and stores the service log in the service log storage unit I26. The service management unit 135 acquires game status information from the game server 3 and stores the game status information in the game status table of the status information storage unit I24. The service management unit 135 acquires the collection status information from the learning server 4 and stores the collection status information in the learning status table of the status information storage unit I24.

(Step S206) The service management unit 135 determines whether or not the learning information requirement condition is satisfied. The learning information requirement condition is, for example, a condition that the manager clicks the buttons BT32, BT33, BT34, BT35, or BT38 in FIG. 5. Further, the learning information requirement condition is, for example, a condition that the data collection condition of the learning setting is satisfied. If the learning information requirement is not satisfied, the service management unit 135 continues the processes of steps S205 and S206.

(Step S207) When the learning information request condition is satisfied, the service management unit 135 transmits an additional learning information request to the learning server 4. The service management unit 135 acquires additional learning information and collection data set from the learning server 4 and saves them in a folder. The service management unit 135 stores the storage destination URI in the collection management table of the collection information storage unit I25.

(Step S208) The delivery management unit 136 transmits the additional learning information and the collection data sets acquired in Step S206 to the delivery destination of the delivery information (for example, the artificial intelligence server 5) by a delivery instruction from the manager. The delivery management unit 136 writes the date in the delivery date of the order information in the order table. When the delivery date has been input by the manager, the delivery management unit 136 may write that date in the delivery date.

(Step S209) The service management unit 135 aggregates the service logs acquired in Step S205 and analyzes them together with the game status information and the collection status information.

<Mobile Terminal and Game Server>

Figure 17:
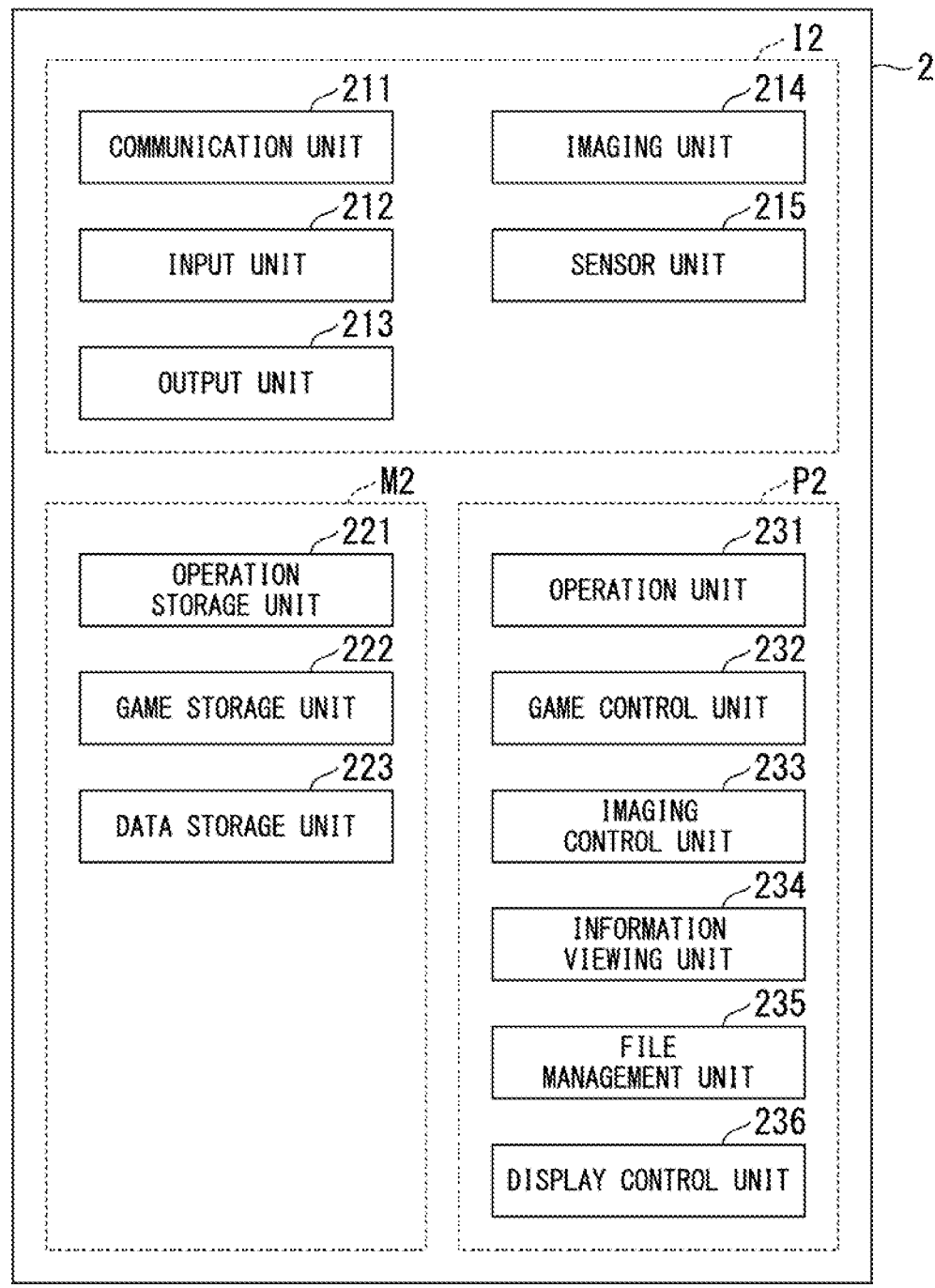
FIG. 17 is a schematic block diagram showing a configuration of a mobile terminal according to the present example embodiment.

FIG. 17 is a schematic block diagram showing the configuration of the mobile terminal 2 according to the present example embodiment.

The mobile terminal 2 is configured by including an input/output unit I2, a storage unit M2, and a control unit P2.

The input/output unit I2 is configured by including a communication unit 211, an input unit 212, an output unit 213, an imaging unit 214, and a sensor unit 215. The storage unit M2 is configured by including an operation storage unit 221, a game storage unit 222, and a data storage unit 223. The control unit P2 is configured by including an operation unit 231, a game control unit 232, an imaging control unit 233, an information viewing unit 234, a file management unit 235, and a display control unit 236.

The communication unit 211 is realized by a communication module and performs communication with other devices.

The input unit 212 is realized by a touch panel or a software keyboard and accepts inputs from the user. The input unit 212 is realized by a microphone or a physical button, and receives inputs by voice or pressing from the user.

The output unit 213 is realized with a display and displays an image (including characters). The output unit 213 is realized by a speaker, a light, or a vibrator, and outputs by sound, light, or vibration.

The imaging unit 214 is realized by a camera and records an image (including a moving image) captured by an imaging element as digital data (image file).

The sensor unit 215 is realized by a sensor such as a GPS (Global Positioning System), acceleration sensor, gyro sensor, or illuminance sensor, measures the state of the device or the surrounding environment of the device (including the state of the user), and saves the data of the measurement result.

The operation unit 231 operates the computer by the OS installed in the operation storage unit 221. The operation unit 231 performs an operation by reading and writing data from/to the operation storage unit 221.

The game control unit 232 controls the game by the game app installed in the game storage unit 222. The game control unit 232 controls the game by reading and writing data from/to the game storage unit 222. Details of the game control unit 232 will be described later.

The imaging control unit 233 is an application that performs image capture using the imaging unit 214. The imaging control unit 233 operates with an API (application programming interface) being called from the game control unit 232. The imaging control unit 233 stores the image file of the image captured by the imaging unit 214 in the data storage unit 223.

The information viewing unit 234 is a web browser. The information viewing unit 234 causes the user to browse a file on the web (for example, the Internet) with an API being called from the game control unit 232. The information viewing unit 234 is an app capable of transmitting and receiving images. The information viewing unit 234 downloads the image file and stores the image file in the data storage unit 223.

The file management unit 235 is a file browser. The file management unit 235 causes the user to browse a file stored in the storage unit M2 with an API being called from the game control unit 232.

The display control unit 236 generates a video signal according to the video data from each unit of the control unit P2, and causes the output unit 213 to display an image.

Note that the imaging control unit 233, the information viewing unit 234, and the file management unit 235 may be apps that are operated directly by input from the user.

Figure 18:
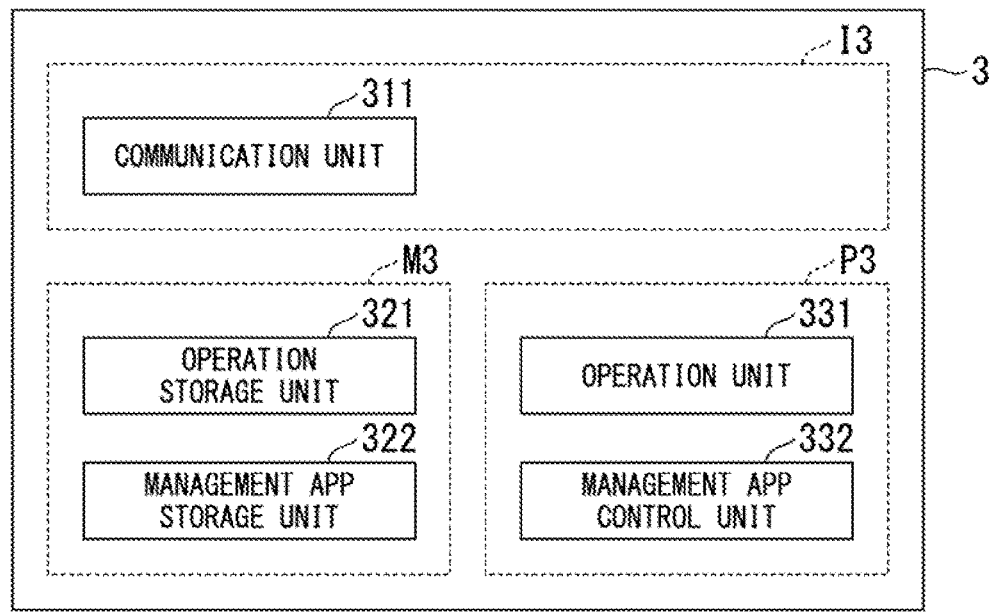
FIG. 18 is a schematic block diagram showing a configuration of a game server according to the present example embodiment.

FIG. 18 is a schematic block diagram showing the configuration of the game server 3 according to the present example embodiment.

The game server 3 is configured by including an input/output unit I3, a storage unit M3, and a control unit P3.

The input/output unit I3 is configured by including a communication unit 311. The storage unit M3 is configured by including an operation storage unit 321 and a management app storage unit 322. The control unit P3 is configured by including an operation unit 331 and a management app control unit 332.

The communication unit 311 is realized by a communication module and communicates with other devices.

The operation unit 331 operates the computer by the OS installed in the operation storage unit 321. The operation unit 331 performs an operation by reading and writing data from/to the operation storage unit 321.

The management app control unit 332 controls the game of the mobile terminal 2 by the management app installed in the management app storage unit 322. The management app control unit 332 controls the game by reading and writing data from/to the management app storage unit 322. Details of the management app control unit 332 will be described later.

Figure 19:
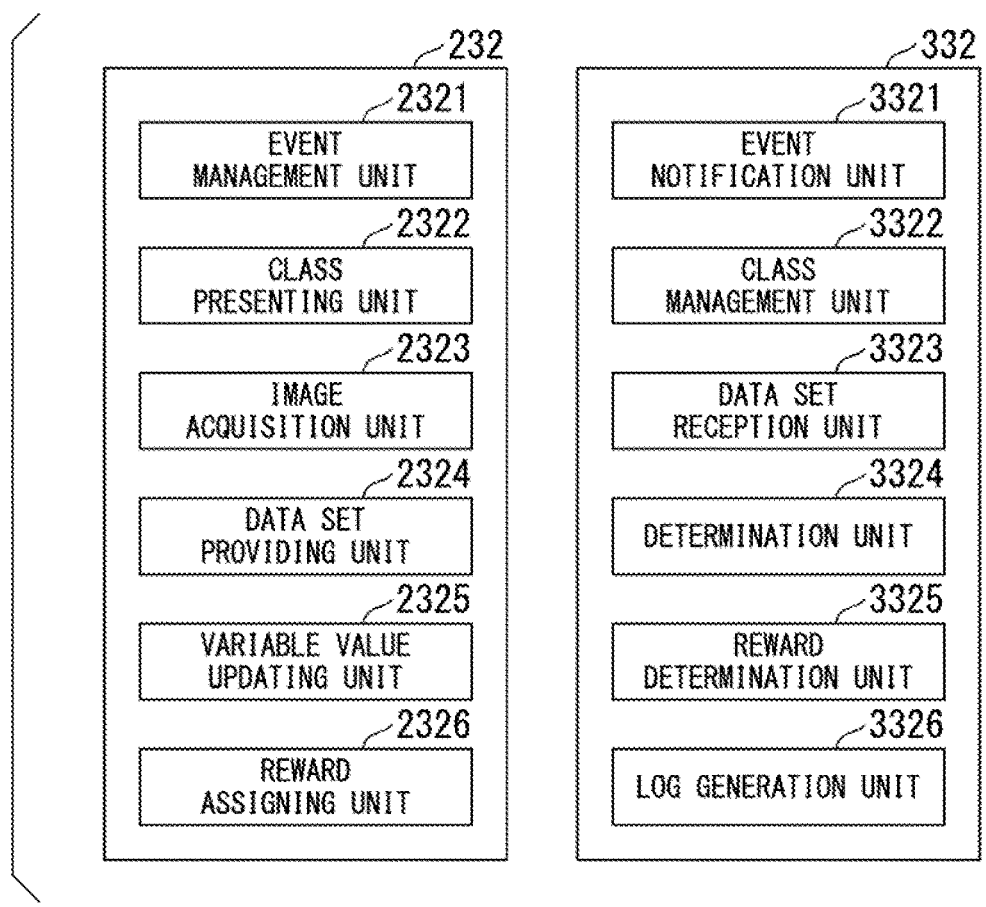
FIG. 19 is a schematic block diagram showing a configuration of a game control unit and a management app control unit according to the present example embodiment.

FIG. 19 is a schematic block diagram showing the configurations of the game control unit 232 and the management app control unit 332 according to the present example embodiment.

The game control unit 232 is configured by including an event management unit 2321, a class presenting unit 2322, an image acquisition unit 2323, a data set providing unit 2324, a variable value updating unit 2325, and a reward assigning unit 2326. The management app control unit 332 is configured by including an event notification unit 3321, a class management unit 3322, a data set reception unit 3323, a determination unit 3324, a reward determination unit 3325, and a log generation unit 3326.

Figure 20:
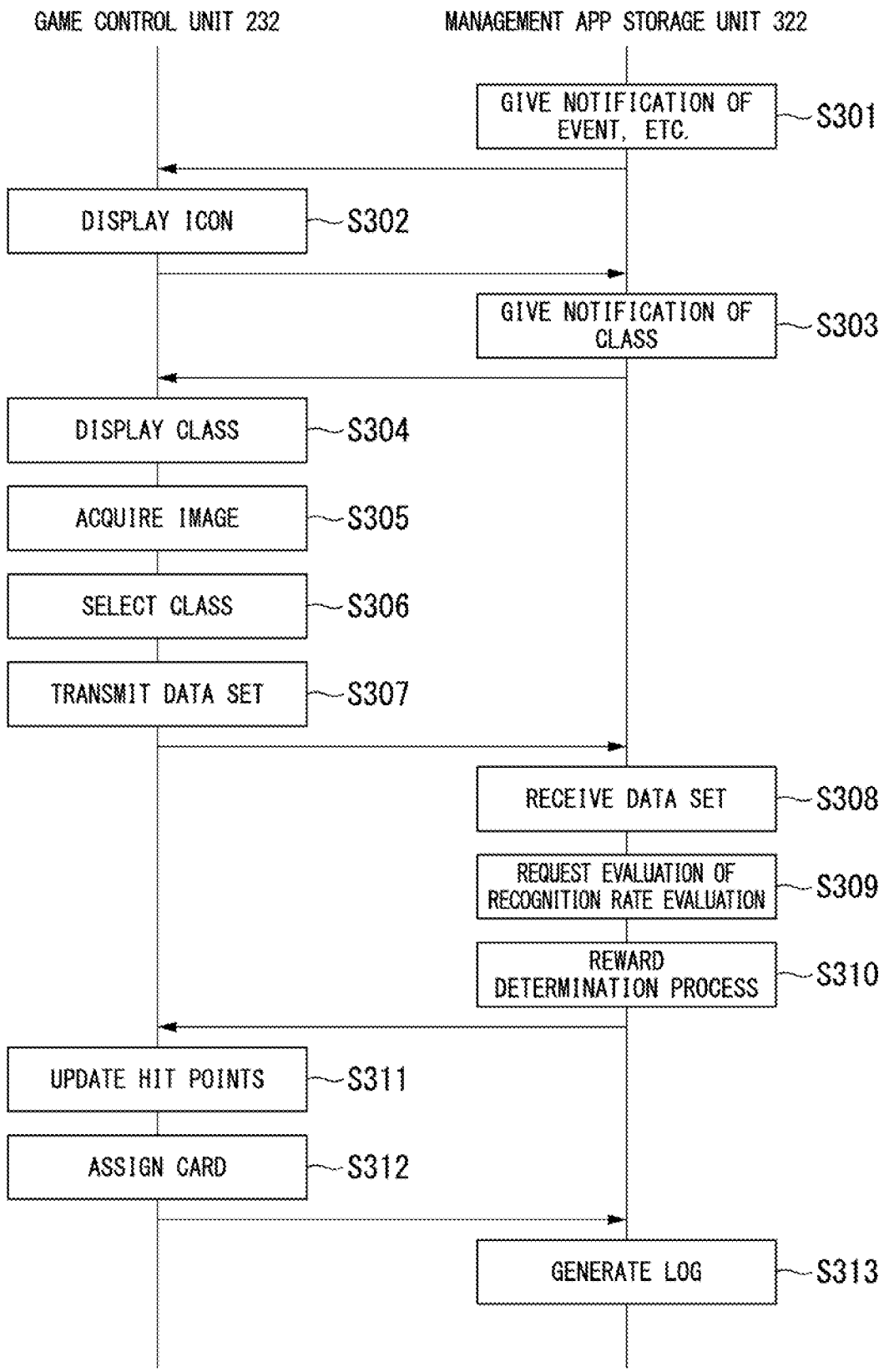
FIG. 20 is a sequence diagram showing an example of processing of a game control unit and a management app control unit according to the present example embodiment.

FIG. 20 is a sequence diagram showing an example of processing of the game control unit 232 and the management app control unit 332 according to the present example embodiment.

Hereinbelow, the processing of each part of the game control unit 232 and the management app control unit 332 will be described with reference to FIGS. 17, 18, and 19. The management app control unit 332 stores the game setting (FIG. 10) received from the management server 1 in the management app storage unit 322.

(Step S301) The event notification unit 3321 reads the game settings stored in the management app storage unit 322, and notifies the game control unit 232 of the service ID, game ID, event ID, and battle character ID of the game settings.

(Step S302) The event management unit 2321 causes the display control unit 236 to display the icon corresponding to the battle character ID in the game with the game ID about which notification was given in Step S301. When this icon is tapped by the user, the event management unit 2321 notifies the management app control unit 332 of the service ID.

(Step S303) The class management unit 3322 refers to the setting class corresponding to the service ID about which notification was given in Step S302 in the game setting. The class management unit 3322 notifies the game control unit 232 of the first class, the second class, and the third class as the referenced setting classes.

(Step S304) The class presenting unit 2322 causes the display control unit 236 to display the setting class about which notification was given in Step S303. For example, in FIG. 1, the display control unit 236 displays the first class (cat), the second class (cheese), and the third class (car) in the area G112 of the screen G11 (output unit 213).

(Step S305) When the user has selected image capture, the image acquisition unit 2323 calls the imaging control unit 233 to allow the user to capture an image. The user images the object of the setting class displayed in Step S304. The image acquisition unit 2323 acquires the image captured by the imaging control unit 233. For example, in FIG. 1, the user taps the button BT11 on the screen G11 to capture the image G121 on the screen G12.

Note that when the user has tapped the button BT11, the image acquisition unit 2323 calls the file management unit 235 to allow the user to select an image file. The image acquisition unit 2323 acquires the image selected by the file management unit 235.

(Step S306) The data set providing unit 2324 causes the display control unit 236 to display a display for the user to select a class. For example, in FIG. 1, the display control unit 236 causes the screen G12 (output unit 213) to display the pull-down menu G122 to allow selection of one of the first class (cat), the second class (cheese), and the third class (car). When the user has selected a class, the data set providing unit 2324 sets the selected class as a confirmation class.

(Step S307) The data set providing unit 2324 transmits the image acquired in Step S305 and the confirmation class selected in Step S306 as a data set to the management app control unit 332.

(Step S308) The data set reception unit 3323 receives the data set transmitted in Step S307.

Figures 27, 28:
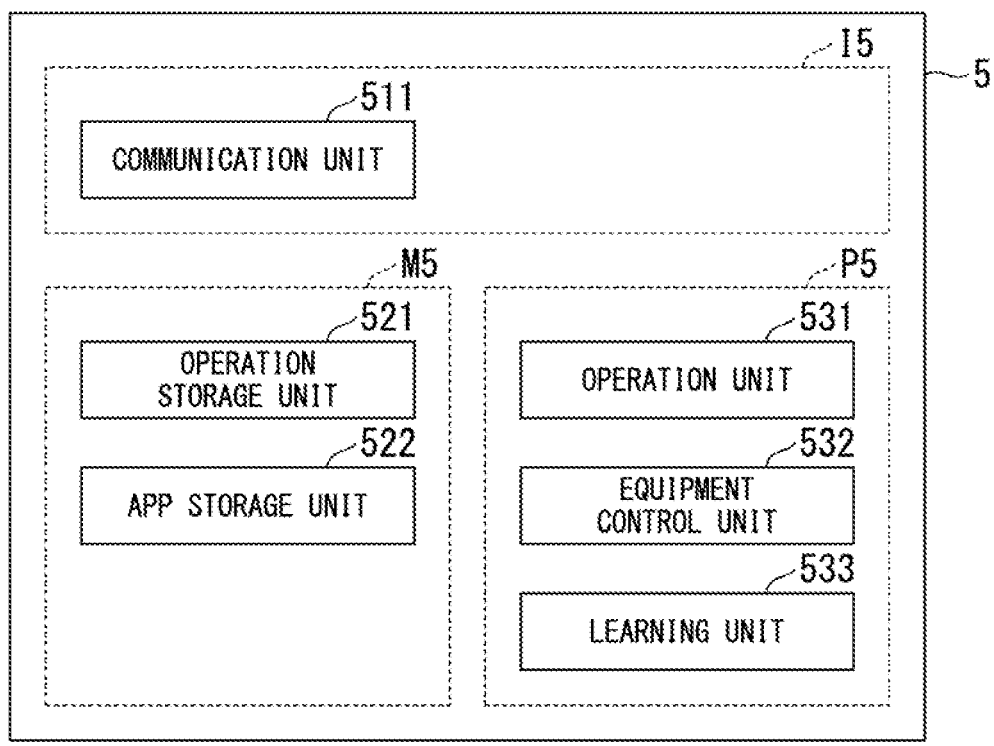
FIG. 27 is a schematic view showing an example of an evaluation value table according to the present example embodiment.
FIG. 28 is a schematic block diagram showing the configuration of an artificial intelligence server according to the present example embodiment.

(Step S309) The determination unit 3324 transmits the data set received in Step S308 to the learning server 4 as an evaluation request requesting recognition evaluation. The determination unit 3324 receives the recognition rate improvement value from the learning server 4 as the evaluation result of the recognition evaluation. The recognition rate improvement value is a value obtained by evaluating the improvement degree of the model recognition rate on a scale of 10 (FIG. 27, which will be described later).

(Step S310) The reward determination unit 3325 determines the reward to be assigned to the user in accordance with the recognition rate improvement value received in Step S309 (also referred to as the "reward determination process"). The reward determination process will be described later (see FIG. 20).

(Step S311) The variable value updating unit 2325 updates the variable (hit point) in the game among the rewards determined in Step S301. The variable value update unit 2325 causes the display control unit 236 to display the result of the update. For example, in FIG. 1, the display control unit 236 displays the image G132 (minus 300 points) and the image G133 (plus 100 points) on the screen G13 (output unit 213).

(Step S312) The reward assigning unit 2326 assigns a game object (card) among the rewards determined in Step S301. The reward assigning unit 2326 causes the display control unit 236 to display the assigned result. For example, in FIG. 1, the display control unit 236 displays the card G141 on the screen G14 (output unit 213).

(Step S311) The log generation unit 3326 generates a game log (see FIG. 15) and transmits the game log to the management server 1. Specifically, the log generation unit 3326 records as the game log the "user ID" of the user, the "date and time" at which the recognition rate improvement value was received in Step S309, and the "data set" (confirmation class and image) of Step S307. Further, the log generation unit 3326 records in the game log the "game ID", "event ID", "battle character ID" and "reward ID" of the reward determined in Step S301 corresponding to the "service ID" about which notification was given in Step S302. The log generation unit 3326 transmits the recorded game log to the learning server 4. In addition, the log generation unit 3326 generates game status information by calculating the number of battles, the number of successes, the number of failures, and temporal changes thereof for each service ID and setting class. The log generation unit 3326 performs transmission to the management server 1 in accordance with the game report setting.

(Reward Determination Process)

The reward determination process performed by the reward determination unit 3325 will be described.

The reward determination unit 3325 refers to the reward selection table (FIG. 21), and sets the reward for the recognition rate improvement value as the reward assigned to the user.

FIG. 21 is a schematic diagram showing an example of the reward selection table according to the present example embodiment.

The reward selection table is stored in the management app storage unit 322 and is used for the reward determination process. The reward selection table may be updated by input from the service setting screen G2 (FIG. 4).

In the reward selection table, the items of service ID, recognition evaluation value, target variable, variable value, assigning condition, and game object are associated with each other. In the reward selection table, the reward selection information is stored as a record with the service ID and the recognition evaluation value serving as the primary keys.

The target variable is a variable in the game that is updated as a reward. The variable value is the value of the variable or the change in the value of the variable after the update. The assigning condition is the condition for assigning a game object. As for the reward, the higher the recognition evaluation value, that is, the higher the model recognition rate, the better the reward that is set. On the contrary, the lower the recognition evaluation value, that is, the lower the model recognition rate, the worse the reward that is set.

Better rewards are rewards that raise the variable value of the operation character, rewards that lower the variable value of the battle character, rewards in which game objects are assigned, or rewards in which game objects of higher rarity are assigned. Worse rewards are rewards that lower the variable value of the operation character, rewards that raise the variable value of the battle character, rewards in which game objects are not assigned, or rewards in which game objects of lower rarity are assigned.

The reward determination unit 3325 determines the reward according to the recognition evaluation value by using the reward selection table stored in the management app storage unit 322. Specifically, the reward determination unit 3325 determines the reward as a better reward as the recognition evaluation value becomes higher. On the contrary, the reward determination unit 3325 determines the reward as a worse reward as the recognition evaluation value becomes lower.

The recognition evaluation value becomes higher as the model recognition rate increases or as the recognition rate improvement value increases. On the contrary, the recognition evaluation value becomes lower as the model recognition rate becomes lower or as the recognition rate improvement value decreases. The recognition rate improvement value is a value obtained by subtracting the model recognition rate of the learned model before learning from the model recognition rate of the learned model after learned by the data set.

Figure 22:
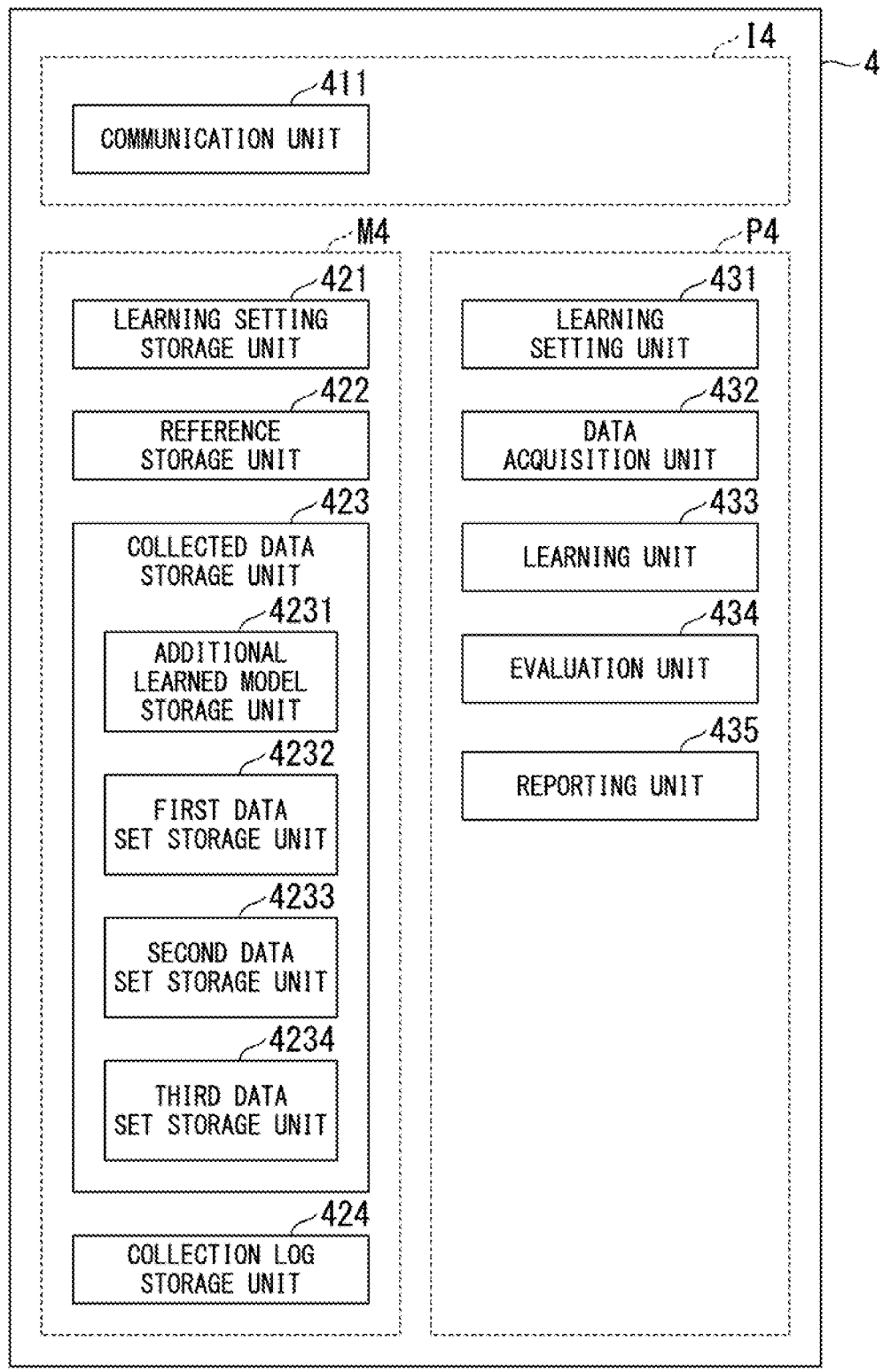
FIG. 22 is a schematic block diagram showing a configuration of a learning server according to the present example embodiment.

FIG. 22 is a schematic block diagram showing the configuration of the learning server 4 according to the present example embodiment.

The learning server 4 is configured by including an input/output unit I4, a storage unit M4, and a control unit P4.

The input/output unit I4 is configured by including a communication unit 411. The storage unit M4 is configured by including a learning setting storage unit 421, a reference storage unit 422, a collected data storage unit 423, and a collection log storage unit 424 for each service ID. FIG. 22 shows the configuration of the learning server 4 for a specific service ID for the sake of simplicity. The control unit P4 is configured by including a learning setting unit 431, a data acquisition unit 432, a learning unit 433, an evaluation unit 434, and a reporting unit 435.

The collected data storage unit 423 is configured by including an additional learned model storage unit 4231, a first data set storage unit 4232, a second data set storage unit 4233, and a third data set storage unit 4234.

<Learning Server>

Figure 23:
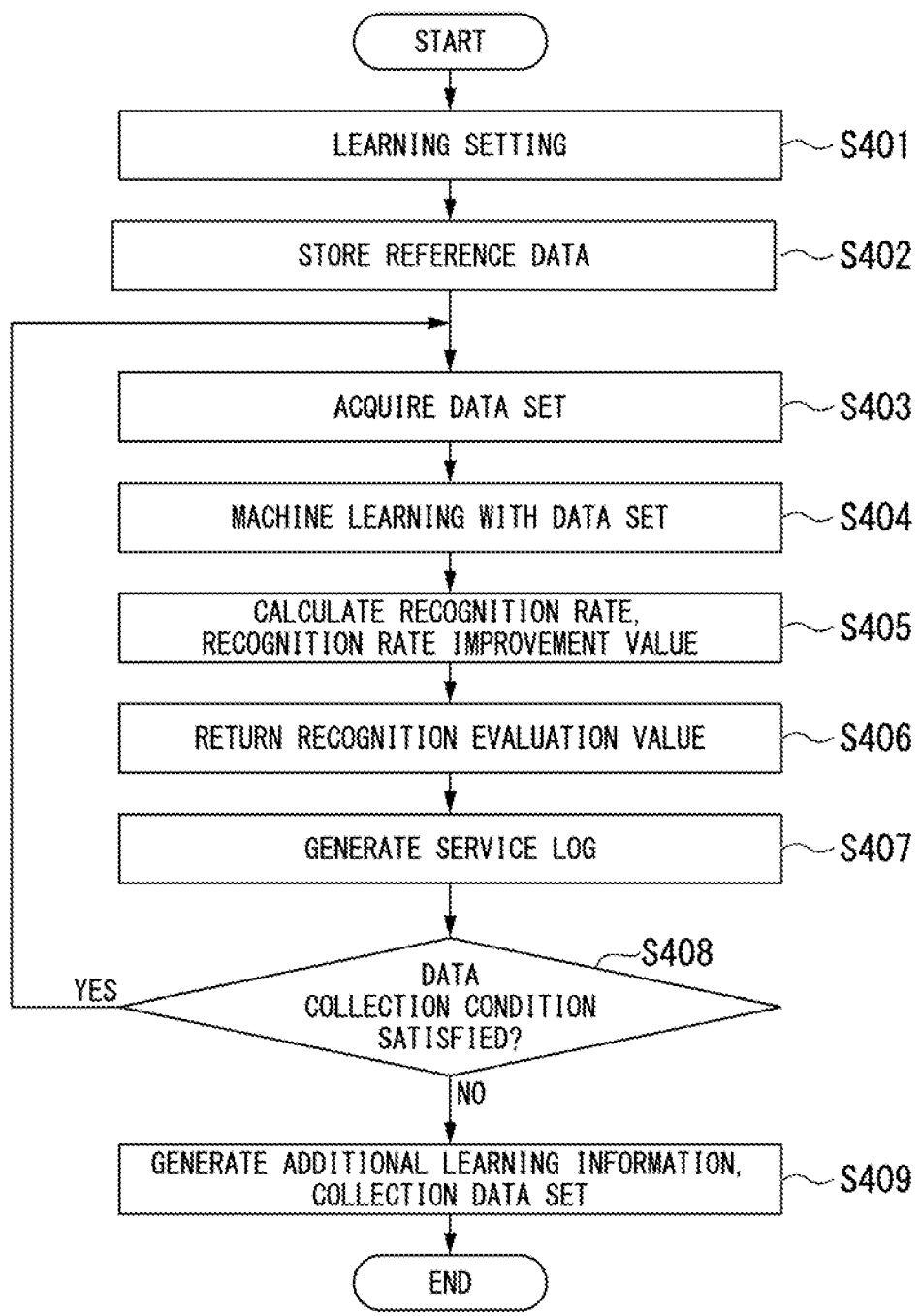
FIG. 23 is a flowchart showing an example of processing of a learning server according to the present example embodiment.

FIG. 23 is a flow chart showing an example of the processing of the learning server 4 according to the present example embodiment.

Hereinbelow, the processing of each part of the learning server 4 will be described with reference to FIG. 22.

Note that each part of the learning server 4 communicates with other devices via the communication unit 411.

(Step S401) The learning setting unit 431 receives the learning setting transmitted from the management server 1 (FIG. 11) and stores the learning setting in the learning setting storage unit 421. The learning setting unit 431 sets a machine learning program of that learning setting. The learned model of the machine learning program set at this time is also referred to as a "reference learned model".

(Step S402) The learning setting unit 431 stores the reference data set of the learning setting in the learning setting storage unit 421. The learning setting unit 431 calculates the model recognition rate (also referred to as "reference recognition rate") for the class of the reference data set by inputting the image of the reference data set into the reference learned model set in Step S401. For example, when an image of a cat and "cat" are the reference data set, the learning setting unit 431 inputs the cat image and calculates as the reference recognition rate the probability that the image is a "cat" among the probabilities of each class that are output.

The learning setting unit 431 stores the calculated reference recognition rate in the reference storage unit 422 as the reference recognition rate. Here, the learning setting unit 431 calculates the reference recognition rate based on at least one pair of reference data sets for each class and stores the reference recognition rate in the reference storage unit 422.

(Step S403) The data acquisition unit 432 receives the evaluation request (Step S114 of FIG. 3 and Step S309 of FIG. 20) transmitted from the game server 3 and acquires the data set input from the user. The data acquisition unit 432 stores the acquired data set in the collected data storage unit 423. When the confirmation class is "cat", "cheese", and "car", the data acquisition unit 432 may store them in the first data set storage unit, the second data set storage unit, and the third data set storage unit, respectively.

(Step S404) Using the data set acquired in Step S403, the learning unit 433 causes the machine learning program to perform further machine learning on the reference learned model set in Step S401. The learned model generated by the machine learning program by this machine learning is also referred to as an "evaluation-learned model."

(Step S405) The evaluation unit 434 calculates the model recognition rate (also referred to as "evaluation recognition rate") by inputting the image of the reference data set of the confirmation class of the data set into the evaluation-learned model. The evaluation unit 434 calculates a value obtained by subtracting the reference recognition rate from the calculated evaluation recognition rate as the recognition rate improvement value.

(Step S406) The evaluation unit 434 determines the recognition evaluation value according to the calculated recognition rate improvement value using the evaluation value table (see FIG. 27). The evaluation unit 434 returns the determined recognition evaluation value as a response to the evaluation request in Step S403.

Details of the evaluation process from Step S404 to Step S406 will be described later.

(Step S407) The reporting unit 435 receives the log transmitted from the game server 3 (Step S117 in FIG. 3 and Step S313 in FIG. 20). The reporting unit 435 generates a service log by adding a model recognition rate, a recognition rate improvement value, and a recognition evaluation value as recognition information to the received log. The reporting unit 435 stores the generated service log in the collection log storage unit 424 and transmits the generated service log to the management server 1 (see FIG. 15). In addition, the reporting unit 435 generates collection status information by calculating the model recognition rate, the number of data sets, and the temporal changes thereof for each service ID and setting class. The reporting unit 435 performs transmission to the management server 1 according to the collection report setting.

(Step S408) The reporting unit 435 determines whether or not the condition of "learning_data collection condition" of the learning setting is satisfied. When the condition is satisfied, the control unit P4 repeats the processes of Steps S403 to S407.

On the other hand, if the condition is not satisfied, the control unit P4 ends the data set collection. In this case, the reporting unit 435 notifies the game server 3 of the service ID to be ended, and ends the event of the event ID corresponding to the service ID.

If the condition for only a specific class (also referred to as "end class") is not satisfied, the control unit P4 ends the collection of the data set for that end class. The reporting unit 435 notifies the game server 3 of the service ID to be ended and the end class, and deletes, for example, the display of the end class in the event of the event ID corresponding to the service ID. In this case, for the other classes, the control unit P4 repeats the processes of steps S403 to S407.

(Step S408) When the additional learning information request is received from the management server, the learning unit 433 reads the data sets (collection data sets) stored in the first data set storage unit 4232, the second data set storage unit 4233, and the third data set storage unit 4234. The learning unit 433 causes the machine learning program to perform machine learning on the reference learned model using the collection data sets that have been read. With this machine learning, the machine learning program generates an additional learned model. The reporting unit 435 transmits the additional learning information and the collection data sets of the additional learning model to the management server 1 as a response to the additional learning information request.

The additional learning information includes the weighting coefficient of the additional learned model in the case of a neural network such as CNN.

<Evaluation Processing>

Details of the evaluation process performed by the control unit P4 will be described below. The following example is an example when the model type of the learning setting is "CNN".

The learning unit 433 extracts the image and confirmation class from the data set input by the user. With respect to the CNN for learning, the learning unit 433 makes the pixel value of the image the input variable to be input to the input layer and sets the confirmation class as an output variable output from the output layer. The output variable may be a numerical value or a classification associated with the confirmation class.

[About CNN]

Figure 24:
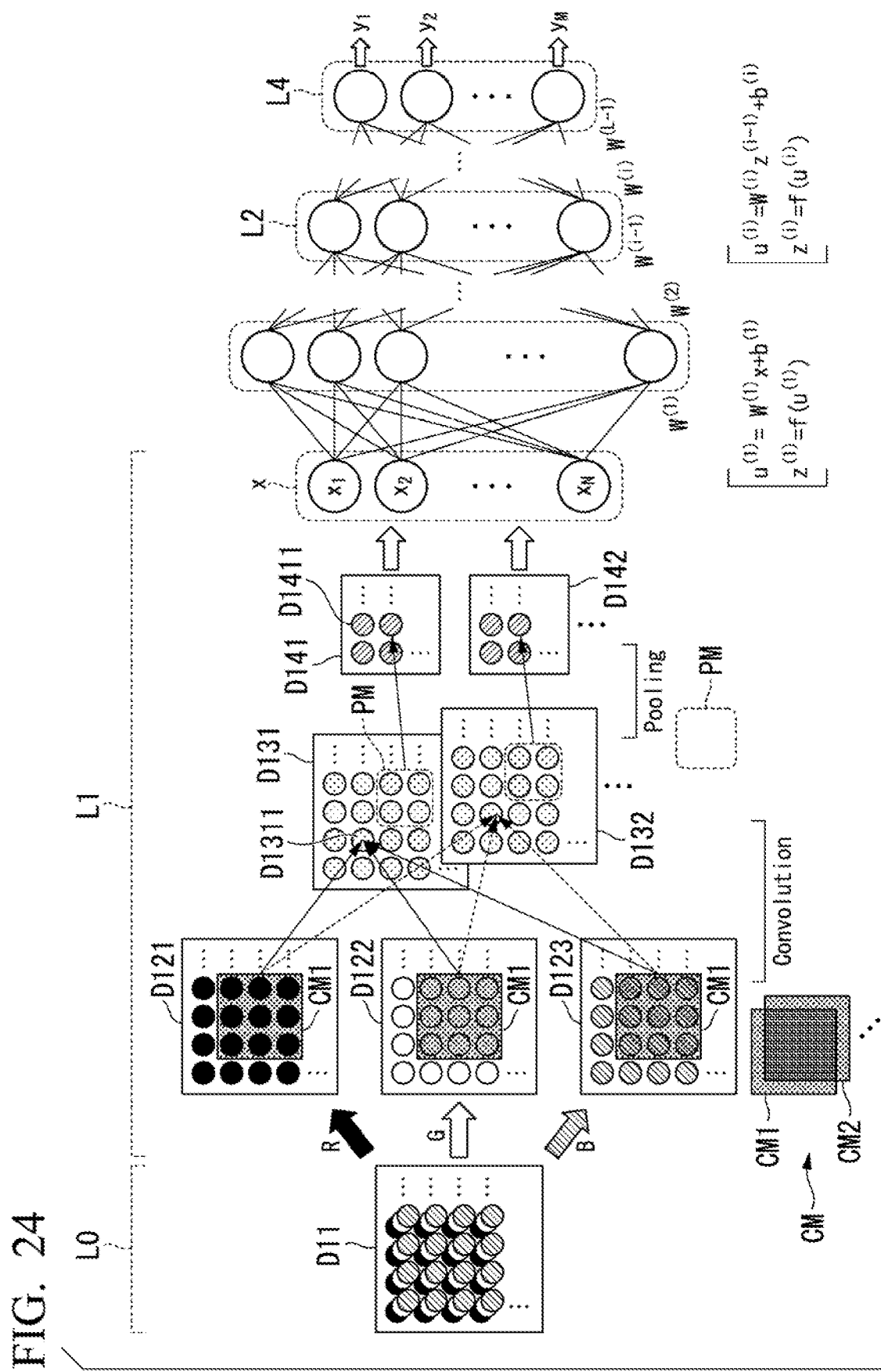
FIG. 24 is an explanatory diagram illustrating an execution procedure in machine learning according to the present example embodiment.

FIG. 24 is an explanatory diagram illustrating an execution procedure in machine learning according to the present example embodiment.

In this figure, CNN is composed of L layers L0 to L4. The layer L1 is also called an input layer, the layers L2 to L3 are also called an intermediate layers or hidden layers, and the layer L4 is also called an output layer.

In CNN, an input image is input to the input layer L0. The input image is represented by a pixel matrix D11 in which the vertical position and the horizontal position of the input image are positions of the matrix. For each element of the pixel matrix D11, an R (red) sub-pixel value, a G (green) sub-pixel value, and a B (blue) sub-pixel value are input as sub-pixel values of the pixels corresponding to the positions of the matrix.

The first intermediate layer L1 is a layer on which a convolution process (also called a filter process) and a pooling process are performed.

(Convolution Process)

An example of the convolution process of the intermediate layer L1 will be described. The convolution process is a process of filtering the original image and outputting a feature map.

Specifically, the pixel value that is input is divided into an R sub-pixel matrix D121, a B sub-pixel matrix D122, and a G sub-pixel matrix D123, respectively. In each of the sub-pixel matrices D121, D122, and D123 (each also referred to as a "sub-pixel matrix D12"), for each submatrix of s row and t column, each element of the submatrix and the element of the convolution matrix CM1 (also called a kernel) of s row and t column are multiplied and added, whereby the first pixel value is calculated. The first pixel value calculated by each sub-pixel matrix D12 is multiplied by a weighting coefficient and added, whereby the second pixel value is calculated. The second pixel value is set in each element of the convolution image matrix D131 as a matrix element corresponding to the position of the submatrix. By shifting the position of the sub-matrix for each element (sub-pixel) in each sub-pixel matrix D12, the second pixel value at each position is calculated, and all the matrix elements of the convoluted image matrix D131 are calculated.

For example, FIG. 24 is an example of the case of a 3-by-3 convolution matrix CM1, and for the convolutional pixel value D1311, a first pixel value is calculated for a submatrix of 4 rows and 4 columns from the 2nd row to the 4th row and the 2nd column to the 4th column of each sub-pixel matrix D12. By a weighting coefficient being calculated and added to the first pixel value of each sub-pixel matrix D121, D122, D123, the second pixel value is calculated as the matrix element of the second row and second column of the convoluted image matrix D131. Similarly, the second pixel value of the matrix element in the third row and the second column of the convolution image matrix D131 is calculated from the submatrix in the third to fifth rows and the second to fourth columns.

Similarly, the convolution image matrix D132, . . . is calculated using another weighting coefficient or another convolution matrix.

(Pooling Process)

An example of the pooling process of the intermediate layer L1 will be described. The pooling process is a process of reducing an image while retaining the features of the image.

Specifically, in the convolution image matrix D131, the representative value of the matrix elements in a region is calculated for each region PM of u rows and v columns. The representative value is, for example, the maximum value. The representative value is set in each element of the CNN image matrix D141 as a matrix element corresponding to the position of the region. By shifting the region in the convolutional image matrix D131 for each region PM, the representative value at each position is calculated, and all the matrix elements of the convolutional image matrix D131 are calculated.

For example, FIG. 24 is an example in the case of a region PM of 2 rows and 2 columns, and for the area of 2 rows and 2 columns from the 3rd row to the 4th row and the 3rd column to the 4th column of the convolution image matrix D131, the maximum value of the second pixel value in the region is calculated as a representative value. This representative value is set in the matrix element of the second row and second column of the CNN image matrix D141. Similarly, the representative values of the matrix elements in the 3rd row and the 2nd column of the CNN image matrix D141 are calculated from the submatrix of the 5th to 6th rows and the 2nd to 4th columns. Similarly, the CNN image matrix D142, . . . is calculated from the convolutional image matrix D132, . . . .

A vector x is generated by each matrix element (N elements) of the CNN image matrices D141, D142, . . . being arranged in a predetermined order. In FIG. 24, the element $x_n$ (n=1, 2, 3, . . . N) of the vector x is represented by N nodes.

The intermediate layer L2 represents an intermediate layer of the i-th intermediate layer (i=2 to L−1). From the node of the i-th intermediate layer, the vector $z^{(i)}$ is output as the value obtained by the vector $u^{(i)}$ being input to the function f $(u^{(i)})$. The vector $u^{(i)}$ is a vector obtained by multiplying the vector $z^{(i-1)}$ output from the node of the i-th intermediate layer by the weight matrix $W^{(i)}$ from the left and adding the vector $b^{(i)}$. The function $f(u^{(i)})$ is an activation function, and the vector $b^{(i)}$ is bias. The vector) $u^{(0)}$ is a vector x.

The node of the output layer L4 is $z^{(L-1)}$, and the output thereof is M $y_m$ (m=1, 2, ... M). That is, a vector y (=($y_1$, $y_2$, $y_3$, ... $y_M$)) having $y_m$ as an element is output from the output layer of CNN.

From the above, the CCN outputs the vector y as an output variable when the pixel value of the input image is input as an input variable. The vector y represents the recognition rate for each class.

Figure 25:
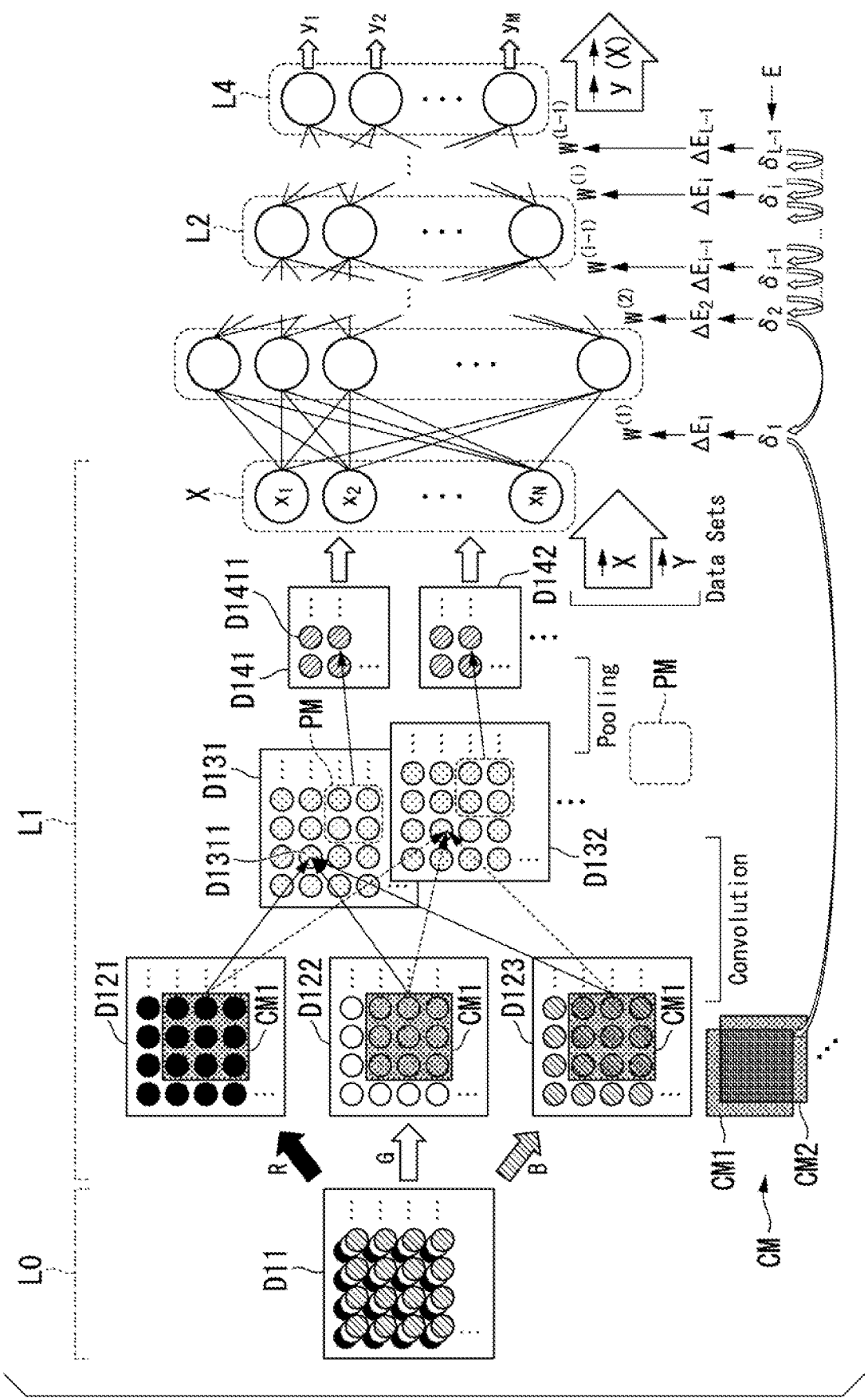
FIG. 25 is an explanatory diagram illustrating a learning procedure in machine learning according to the present example embodiment.

FIG. 25 is an explanatory diagram illustrating a learning procedure in machine learning according to the present example embodiment.

In this figure, it is an explanatory diagram when the CNN of FIG. 24 performs machine learning.

Let the vector x output from the first intermediate layer be a vector X with respect to the pixel value of the image of the data set. Let the vector representing the confirmation class of the data set be the vector Y.

An initial value is set in the weight matrix $W^{(i)}$. When the input image is input to the input layer and as a result, the vector X is input to the second intermediate layer, the vector y(X) corresponding to the vector X is output from the output layer. The error E between the vector y(X) and the vector Y is calculated using a loss function. The gradient $\Delta E_i$ of the i-th layer is calculated using the output $z_i$ from each layer and an error signal $\delta_i$. The error signal $\delta_i$ is calculated using the error signal $\delta_{i-1}$. In addition, transmitting the error signal from the output layer side to the input layer side in this way is also called back propagation.

The weight matrix $W^{(i)}$ is updated on the basis of the gradient $\Delta E_i$. Similarly, in the first intermediate layer, the convolution matrix CM or the weighting coefficient is updated.

[Setting of Reference Learned Model]

In the case of a CNN, the learning setting unit 431 sets the number of layers, the node number of each layer, the method of coupling the nodes between each layer, the activation function, the error function, the gradient descent algorithm, the pooling area, the kernel, the weighting coefficient, and the weight matrix.

The learning setting unit 431 sets, for example, four layers (L=3) as the number of layers. However, the present invention is not limited thereto, and the total number may be five or more layers. As the number of nodes in each layer (also referred to as "the node number"), the learning setting unit 431 sets 800 for the number of elements of the vector x (node number N), 500 for the node number in the second intermediate layer (i=2), and 10 for the output layer (i=3). However, another value may be set for the node number.

The learning setting unit 431 makes 20 convolution matrix CMs of 5 rows and 5 columns, and sets a region PM of 2 rows and 2 columns. However, the present invention is not limited thereto, and a different number of matrices or a different number of convolution matrix CMs may be set. Further, a region PM having a different number of matrices may be set.

The learning setting unit 431 may perform more convolution processing or pooling processing.

The learning setting unit 431 sets full coupling as the coupling of each layer of the neural network. However, the present invention is not limited thereto, and the coupling of some or all layers may be set to non-full coupling. The learning setting unit 431 sets a sigmoid function as an activation function for the activation functions of all layers. However, the present invention is not limited thereto, and the activation function of each layer may be another activation function such as a step function, a linear combination, a soft sign, a soft plus, a ramp function, a truncated power function, a polynomial, an absolute value, a radial basis function, a wavelet, a maxout, and the like. Also, the activation function of one layer may be of a different type from that of another layer.

The learning setting unit 431 sets a squared loss (mean squared error) as an error function. However, the present invention is not limited thereto, and the error function may be cross entropy, τ-quantile loss, Huber loss, or c sensitivity loss (c tolerance function). Further, the learning setting unit 431 sets SGD (stochastic gradient descent) as an algorithm for calculating the gradient (gradient descent algorithm). However, the present invention is not limited thereto, and Momentum (inertia term) SDG, AdaGrad, RMSprop, AdaDelta, Adam (Adaptive momentum estimation) and the like may be used for the gradient descent algorithm.

The learning setting unit 431 is not limited to the convolutional neural network (CNN), and may set other neural networks such as a perceptron neural network, a recurrent neural network (RNN), and a residual network (ResNet). In addition, the learning setting unit 431 may set some or all of the learned models of supervised learning such as a decision tree, regression tree, random forest, gradient boosting tree, linear regression, logistic regression, or SVM (support vector machine).

[Evaluation Processing]

As a result of learning using the CNN as an evaluation-learned model, the learning unit 433 acquires the weight matrix $w^{(i)}$ convolution matrix CM or the CNN whose weight coefficient has been updated.

By inputting the pixel value of the image of the reference data set into the evaluation-learned model, the evaluation unit 434 acquires the evaluation recognition rate as the output. The evaluation unit 434 calculates a value obtained by subtracting the reference recognition rate from the calculated evaluation recognition rate as a recognition rate improvement value.

Figure 26:
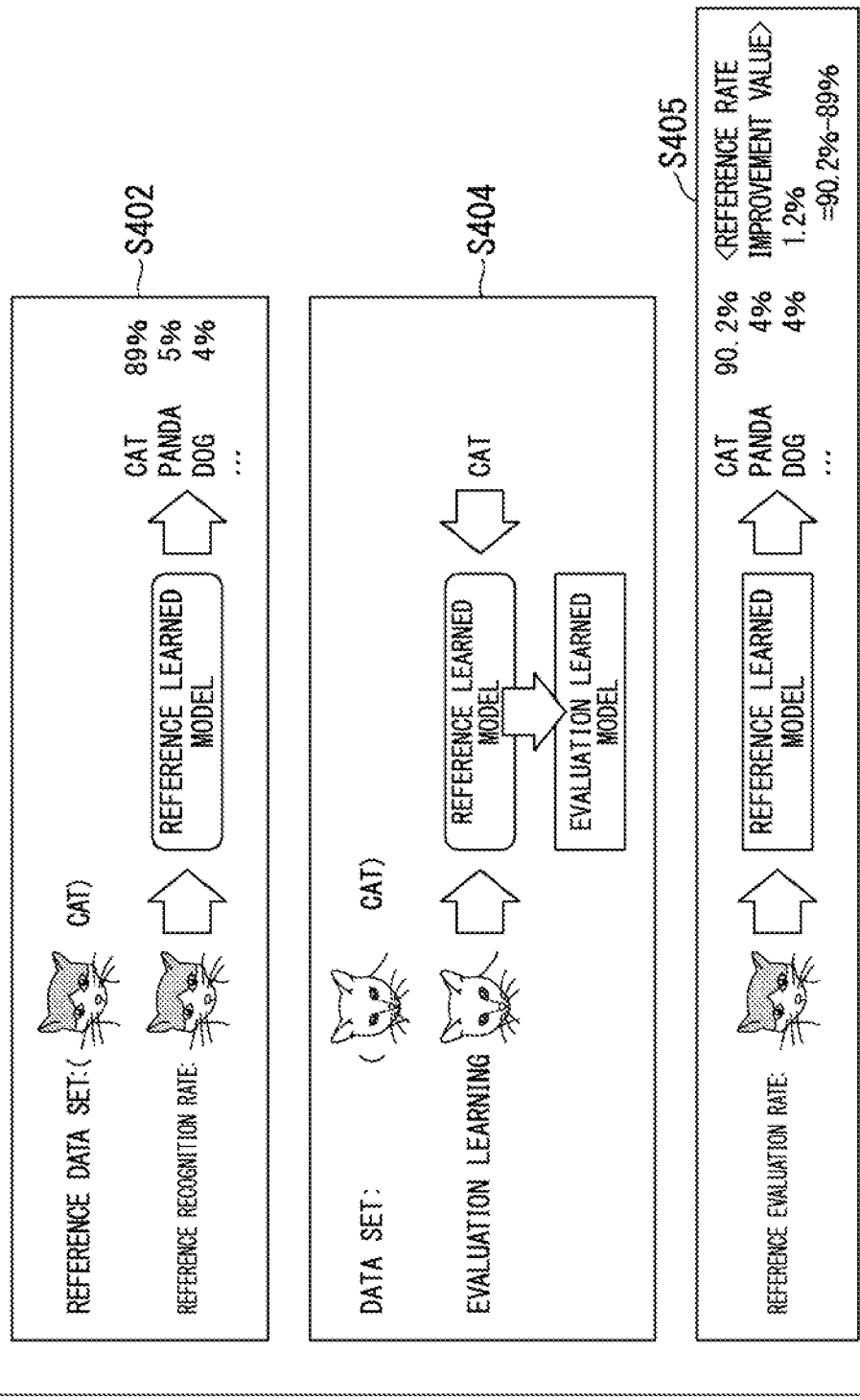
FIG. 26 is an explanatory diagram illustrating the process of calculating a recognition rate improvement value according to the present example embodiment.

FIG. 26 is an explanatory diagram illustrating the calculation process of the recognition rate improvement value according to the present example embodiment.

This diagram is an explanatory diagram for the case of the processing of FIG. 23 being performed when the confirmation class is "cat".

In the process of Step S402, the reference recognition rate in the reference learned model is "89%" of "cat" for the image of the reference data set.

In the process of Step S404, as a result of machine learning on the reference learned model using the data set input from the user, an "evaluation learned model" is generated.

In Step S405, the reference recognition rate in the "evaluation-learned model" is "90.2%" of "cat" with respect to the image in the reference data set.

In this case, the recognition rate improvement value in the class "cat" is calculated to be 1.2% (90.2%-89%).

FIG. 27 is a schematic view showing an example of the evaluation value table according to the present example embodiment.

The evaluation unit 434 determines the recognition evaluation value according to the recognition rate improvement value by using the evaluation value table stored in the reference storage unit 422. The evaluation value table may be updated by input from the service setting screen G2 (FIG. 4).

In the evaluation value table, each of the items of the service ID, the recognition rate improvement value, and the recognition evaluation value are associated with each other. As the recognition evaluation value, the evaluation value information is stored as a record, with the service ID and the recognition rate improvement value serving as primary keys.

The higher the recognition rate improvement value, the higher the value that is set for the recognition evaluation value. Conversely, the lower the recognition rate improvement value, the lower the value that is set for the recognition evaluation value.

Regarding the relationship between the recognition rate improvement value and the recognition evaluation value, a different relationship can be set for each service ID. For example, even in the same data set, the recognition rate improvement value normally differs for different reference model settings (reference learned model). In the present example embodiment, the relationship between the recognition rate improvement value and the recognition evaluation value can be set for each service ID, so that the machine learning system Sys can set a different relationship even when the reference model settings differ (the service IDs also differ). Thereby, the machine learning system Sys can absorb differences of the reference and assign a reward to the user even if there has been a change in the calculation standard of the recognition rate improvement value in the recognition evaluation.

<Artificial Intelligence Server 5 and Control Device 6>

FIG. 28 is a schematic block diagram showing the configuration of the artificial intelligence server 5 according to the present example embodiment.

The artificial intelligence server 5 is configured by including an input/output unit I5, a storage unit M5, and a control unit P5.

The input/output unit I5 is configured by including a communication unit 511. The storage unit M5 is configured by including an operation storage unit 521 and an app storage unit 522. The control unit P5 is configured by including an operation unit 531, an equipment control unit 532, and a learning unit 533.

The communication unit 511, which is realized by a communication module, communicates with other devices.

The operation unit 531 performs an operation of the computer by the OS installed in the operation storage unit 521. The operation unit 531 performs operations by reading and writing data from/to the operation storage unit 521.

The device control unit 532 controls the control device 6 by the application installed in the app storage unit 522. The device control unit 532 stores the additional learned model delivered from the management server 1 in the app storage unit 522. The device control unit 532 inputs the image input from the control device 6 into this additional learned model, and controls the control device 6 using the class that has been output.

Note that the learning unit 533 may perform further machine learning on the additional learned model using another data set. Further, the learning unit 533 may perform machine learning on another learned model (for example, a reference learned model) by using a part or all of the collection data set delivered from the management server 1.

Figure 29:
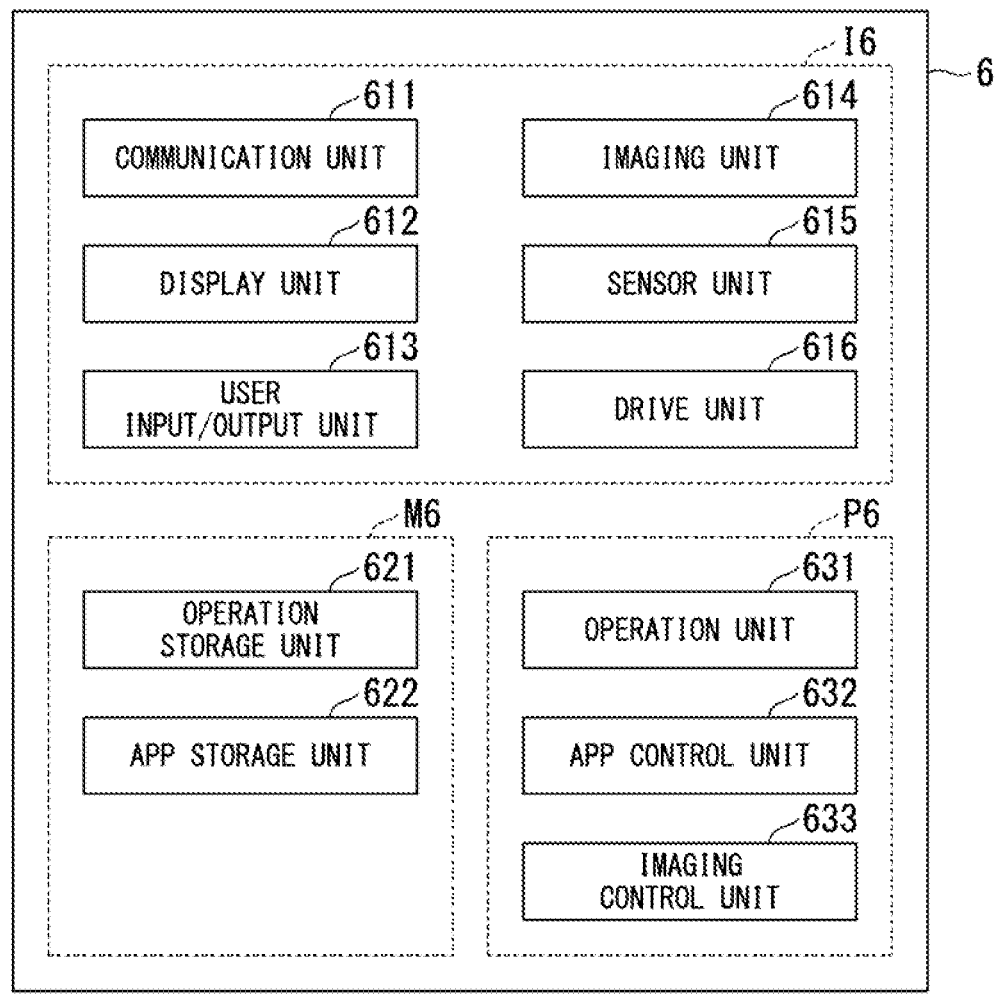
FIG. 29 is a schematic block diagram showing a configuration of a control device according to the present example embodiment.

FIG. 29 is a schematic block diagram showing the configuration of the control device 6 according to the present example embodiment.

The control device 6 is configured by including an input/output unit I6, a storage unit M6, and a control unit P6.

The input/output unit I6 is configured by including some or all of a communication unit 611, an input unit 612, an output unit 613, an imaging unit 614, a sensor unit 615, and a drive unit 616. The storage unit M6 is configured by including an operation storage unit 621 and an app storage unit 622. The control unit P6 is configured by including an operation unit 631, an app control unit 632, and an imaging control unit 633.

The communication unit 611 is realized by a communication module and performs communication with other devices.

The input unit 612 is realized by a touch panel or a software keyboard and accepts inputs from the user. The input unit 612 is realized by a microphone or a physical button, and receives inputs by voice or pressing from the user.

The output unit 613 is realized with a display and displays an image (including characters). The output unit 613 is realized by a speaker, a light, or a vibrator, and outputs by sound, light, or vibration.

The imaging unit 614 is realized by a camera and records an image (including a moving image) captured by an imaging element as digital data (image file).

The sensor unit 615 is realized by a sensor such as a GPS, acceleration sensor, gyro sensor, illuminance sensor, infrared sensor, temperature sensor, attitude sensor, or the like, measures the state of the device or the surrounding environment of the device, and saves the data of the measurement result.

The drive unit 616 is an operating device such as an arm portion or a grip portion of a robot arm, a control device such as air conditioning or temperature control, or a device that changes a physical operation or a physical state.

The operation unit 631 operates the computer by the OS installed in the operation storage unit 621. The operation unit 631 performs an operation by reading and writing data from/to the operation storage unit 621.

The app control unit 632 controls the output by the application installed in the app storage unit 622. The app control unit 632 controls the output by reading and writing data from/to the app storage unit 622.

The imaging control unit 633 is an application that performs image capture using the imaging unit 614. The imaging control unit 633 operates with an API being called from the app control unit 632.

The app control unit 632 transmits the image captured by the imaging unit 614 to the artificial intelligence server 5. The app control unit 632 receives the class from the artificial intelligence server 5. The app control unit 632 controls each unit of the input/output unit I6 according to the received class.

<Summary>

(1) As described above, the machine learning system (for example, the machine learning system Sys) includes a first system (for example, a data collection system SysA) and a second system (artificial intelligence system SysB).

In the first system, a presenting unit (for example, a game control unit 232, a class presenting unit 2322) presents response information for machine learning (for example, class). The input unit (for example, the image acquisition unit 2323) receives an input of explanatory information (for example, an image) for the response information from the user. The acquisition unit (for example, the data set providing unit 2324, the data set reception unit 3323, and the data acquisition unit 432) acquires the explanatory information and the response information. The evaluation unit (for example, evaluation unit 434) performs an evaluation (for example, recognition evaluation) of a classification accuracy (for example, recognition rate) of the response information by the explanatory information on the basis of a data set of an input variable (for example, pixel values of an image)

based on the explanatory information and an output variable (for example, a confirmation class) based on the response information, and a predetermined learned model. The reward assigning unit (for example, the reward determining unit 3325 and the reward assigning unit 2326) assigns to the user a reward in accordance with the evaluation (for example, increase/decrease in hit points, card). The history generation unit (for example, the reporting unit 435) generates history information (a service log) in which the response information, the evaluation result, and the reward are associated.

In the second system, the model storage unit (for example, the app storage unit 522) stores a learned model (for example, an additional learned model) in which learning has been performed on the basis of at least one of the data sets. The execution unit (for example, the device control unit 532) outputs the response information when the explanatory information has been input on the basis of the learned model stored in the model storage unit.

Thereby, the machine learning system, after presenting the response information, can collect from each user a data set of the response information and the explanatory information as data used for the machine learning. Since each user inputs explanatory information, the machine learning system can acquire many number of data sets or various data sets, and can more efficiently collect data used for machine learning.

Since the machine learning system can provide explanatory information by a simple operation after the user has specified the response information, it is possible to efficiently collect the data used for machine learning. In addition, since the user is assigned a reward according to the evaluation result, an image that improves the evaluation result is provided. In this case, the machine learning system can collect an image with a good evaluation result as data used for machine learning. In addition, since the machine learning system generates history information in which the response information, the evaluation result, and the reward are associated, by for example aggregating the history information, it is possible to analyze the relationship between the response information, the evaluation result, and the reward.

Note that the response information may be a response variable other than class, a dependent variable, or an external criterion. The response information may be output or information related to output in supervised learning. The response information may be training data. The explanatory information may be an independent variable other than the image, and may be, for example, a character string, a waveform such as a sound, or a coordinate value such as a feature space. The explanatory information may be input or information regarding input in supervised learning. Input variables and output variables include duplicates of explanatory information and response information, respectively. Further, the output variable may be an image.

In addition, explanatory information being inputted from the user includes inputting a plurality of explanatory variables at once or continuously. For example, transmitting a plurality of captured images of a "cat" to a presented class (for example, "cat") at one time is included. Sending a plurality of images at once includes transmitting a group of continuously shot images at once. When transmitting a group of continuously captured images, the machine learning system Sys can acquire a plurality of similar images as a data set. Thereby, the machine learning system Sys can use, for example, an image having a high model recognition rate for learning as a plurality of image groups, and may be able to increase the recognition rate improvement value. Further, when transmitting a group of continuously captured images, the game server 3 (control unit P3) or the learning server 4 (control unit P4) may make the maximum value of the recognition rate improvement value the recognition rate improvement value, or may add or multiply the recognition rate improvement value. Further, when transmitting a group of continuously captured images, the game server 3 may determine a higher reward as compared with the case of transmitting one image.

The reward may be a reward of other than the game. For example, the reward may be commercial transaction medium content. The commercial transaction medium may be, for example, electronic money, points in a point service, a voucher for goods or services, or a coupon. Vouchers include those for downloading electronic data such as music, video, and images, and those that assign the right to use electronic data such as access to limited content. The coupon includes, for example, a coupon that can be used at a partner restaurant, a point attached to a card that can be used at an e-commerce site, and the like. Here, the card includes not only a credit card and a contactless card that can be used for payment of money, but also a card that can be used as a substitute for money. The game server 3 may generate report information for reporting to the business partner the number of rewards assigned. Further, the management server 1 may receive report information indicating the number of rewards assigned from the game server 3 and generate payment information for making payments to the business partner in accordance with the number of rewards assigned.

The classification accuracy is not limited to the classification accuracy and recognition accuracy, but also includes the identification accuracy. The evaluation of the classification accuracy of the response information by the explanatory information is not limited to the above-mentioned recognition evaluation. For example, an image of a data set may be input and the recognition rate in the confirmation class may be compared with the reference recognition rate. In this case, the value obtained by subtracting the reference recognition rate from the recognition rate in the confirmation class may serve as the recognition rate improvement value.

The predetermined learned model may be the type or various variables of a learned model obtained from the request destination, or may be a fixed or selected learned model. For example, the learned model used by the artificial intelligence server 5-1 and the learned model used by the learning server 4 for recognition evaluation may differ. When they are different, the management server 1 may deliver the collection data set, and the learning unit 533 may perform machine learning using the delivered collection data set. The learned model used by the artificial intelligence server 5-1 may be machine-learned using a part of the collection data set.

(2) Further, in the machine learning system, the presenting unit presents response information representing an object (for example, the subject of an image). The input unit receives an input of an image in which the object is drawn as the explanatory information. The evaluation unit evaluates classification accuracy of the response information by the image. The execution unit outputs response information representing an object when an image in which the object is drawn has been input.

Thereby, the machine learning system can collect images according to the objects to be collected as data used for machine learning. In addition, since the user can know the presented object first, it is possible to identify the object, take a picture of the object, or search the folder.

The images are not limited to photographs, illustrations, and animation images. For example, the image may be an image in which a physical quantity is measured and the distribution thereof is represented. For example, the image may be a thermography in which infrared rays emitted from an object are analyzed and the heat distribution is represented as a diagram.

Drawing may mean being able to be rendered as an image or video on a computer. Further, drawing may include being photographed, being captured in an image, being drawn as an illustration or the like.

(3) Further, in the machine learning system, the presenting unit presents the response information on a display unit of each information terminal (for example, mobile terminals 2-1 to 2-N) of a plurality of users. The acquisition unit acquires the explanatory information input from the input unit of each of the information terminals.

Thereby, the machine learning system can collect a data set of response information and explanatory information as data used for machine learning from a plurality of users. Since a plurality of users input explanatory information, the machine learning system can acquire many data sets or various data sets, and can more efficiently collect data used for machine learning.

The information terminal is not limited to a smartphone, but may be a tablet terminal, a head-mounted display, a personal computer, a music player, a digital camera, a television, a smart speaker, a home appliance, a wearable terminal, or the like. The information terminal is not limited to a portable terminal, and may be a stationary terminal.

(4) Further, in the machine learning system, the first system includes a plurality of information terminals and a server (learning server 4) connected to each of the plurality of information terminals via the Internet. An application program (for example, a mobile application or a game app) provided via the Internet causes each of the information terminals to function as the presenting unit and the input unit. The server includes the acquisition unit. The acquisition unit acquires the explanatory information and the response information from each of the information terminals of a plurality of users via the Internet.

Thereby, the machine learning system provides the application program via the Internet, so as to be widely usable by general users. The machine learning system can acquire many data sets or various data sets, and can collect data used for machine learning more efficiently.

The application program is not limited to games, and may be an application program such as one for information browsing, image browsing, communication, and office tools.

(5) Further, in the machine learning system, the first system further includes an order management unit (for example, order management unit 131) and a delivery management unit (for example, delivery management unit 136). The order management unit manages request source information indicating a request source that requests acquisition of the explanatory information and the response information, being the request source relating to the second system. The delivery management unit manages the delivery status to the request source indicated by the request source information, being the delivery status of the data set. The model storage unit stores a learned model in which learning has been performed on the basis of at least one of the delivered data sets.

Thereby, the machine learning system can receive orders for collecting data sets from multiple request sources and manage the orders. The machine learning system can also manage the delivery of the data sets. As a result, the machine learning system can provide the manager with a platform of a service for collecting data sets, and can smoothly carry out business by the service.

(6) Further, in the machine learning system, the presenting unit presents a plurality of sets of the response information (see the area G112 and the pull-down menu G122 in FIG. 1). The input unit receives an input of the response information selected by the user and explanatory information for the response information. The acquisition unit acquires the explanatory information and the response information for the plurality of sets of the response information.

This allows the user to select response information that can provide explanatory variables from a plurality of pieces of response information. For example, a user can choose a class that can take a picture or hold an image, so a machine learning system can increase the potential of being able to collect data sets compared to presenting only one. In addition, the machine learning system can reduce the possibility that the user cannot provide the image of a class, gives up the game, and no longer uses the service, as compared with the case where only one is presented.

(7) Further, in the machine learning system, the first system includes an information terminal, and the information terminal includes the presenting unit, the input unit, and an imaging unit (for example, an imaging unit 214), and the presenting unit presents response information representing an object, and the input unit receives as the explanatory information an input of the image in which the object is drawn, being the image captured by the imaging unit, as the explanatory information.

This allows the user to input an image to be captured from now or an image captured in the past from an information terminal capable of capturing and recording images. For example, the user can take a picture of the presented object with the imaging unit of the information terminal whose presentation is referred to. Even if the presented object does not have an image in which the presented object is depicted, the user can take a picture with the information terminal that referred to the presentation and provide the captured image.

(8) Further, in the machine learning system, the game program causes each of the plurality of information terminals to function as the presenting unit, the input unit, and the reward assigning unit. The presenting unit presents the response information at an in-game event. In the input unit, an image for the response information is input as the explanatory information so that the user can advance the game. The reward assigning unit updates variables in the game or assigns game objects as rewards of the game.

This allows the user to provide the data set while having fun playing the game.

In-game events are battles in the game, and the like. In a game scenario, the user encounters an opponent, the user selects an opponent, or the battle starts automatically under predetermined conditions. Opponents include not only computer-controlled non-player characters, but also characters operated by humans via communication and the like.

(9) Further, in the machine learning system, the setting unit (for example, the setting update unit 132) determines the response information (for example, the class with a low recognition rate) that causes the presenting unit to present based on the classification accuracy of the response information in the predetermined learned model.

Thereby, the machine learning system can present response information with low classification accuracy and acquire explanatory information of the response information. As a result, the machine learning system can preferentially improve the classification accuracy of the response information having low classification accuracy.

The setting update unit 132 inputs the reference data set into the reference learned model, and determines the class having a low recognition rate as the setting class.

<Hardware Configuration>

Figure 30:
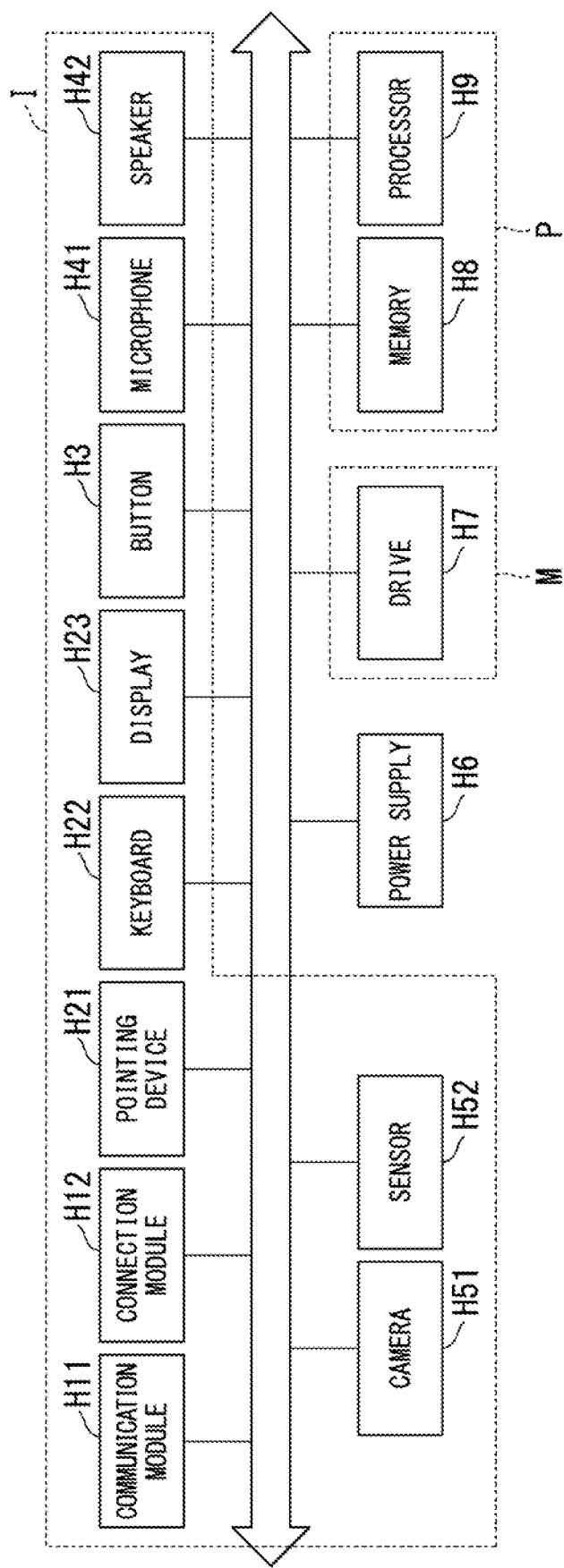
FIG. 30 is a schematic view showing an example of a hardware configuration of the device according to the present example embodiment.

FIG. 30 is an explanatory diagram illustrating the hardware configuration of each device according to the present example embodiment.

Each device means the management server 1, the mobile terminal 2, the game server 3, the learning server 4, the artificial intelligence server 5, the control device 6, or the terminal T1. Each device is configured by including an input/output module I, a storage module M, and a control module P. The input/output module I is realized by including some or all of a communication module H11, a connection module H12, a pointing device H21, a keyboard H22, a display H23, a button H3, a microphone H41, a speaker H42, a camera H51, or a sensor H52. The storage module M is realized including a drive H7. The storage module M may be further configured to include a part or all of a memory H8. The control module P is realized including the memory H8 and a processor H9. These hardware components are communicably connected to each other via a bus, and are supplied with power from a power supply H6.

The connection module H12 is a digital input/output port such as USB (Universal Serial Bus). In the case of a mobile device, the pointing device H21, the keyboard H22, and the display H23 are touch panels. The sensor H52 is an acceleration sensor, a gyro sensor, a GPS receiving module, a proximity sensor, and the like. The power supply H6 is a power supply unit that supplies electricity necessary for operating each device. In the case of a mobile device, the power supply H6 is a battery.

The drive H7 is an auxiliary storage medium such as a hard disk drive or a solid-state drive. The drive H7 may be a non-volatile memory such as an EEPROM or a flash memory, or a magneto-optical disk drive or a flexible disk drive. Further, the drive H7 is not limited to one built into each device, and may be an external storage device connected to the connector of the IF module H12.

The memory H8 is a main storage medium such as a random access memory. The memory H8 may be a cache memory. The memory H8 stores these instructions when the instructions are executed by one or more processors H9.

The processor H9 is a CPU (Central Processing Unit). The processor H9 may be an MPU (micro-processing unit) or a GPU (graphics processing unit). The processor H9 reads a program and various data from the drive H7 via the memory H8 and performs an operation to execute an instruction stored in one or a plurality of memories H8.

The input/output module I realizes the input/output units I1, I2, I3, I4, I5, and I6. The storage module M realizes storage units M1, M2, M3, M4, M5, and M6. The control module P realizes the control units P1, P2, P3, P4, P5, and P6.

In this specification and the like, the descriptions of the management server 1, the mobile terminal 2, the game server 3, the learning server 4, the artificial intelligence server 5, and the control device 6 may be replaced with the descriptions of the control units P1, P2, P3, P4, P5 and P6, respectively, and the description of each of these devices and the terminal T1 may be replaced with the description of the control module P.

<Modification Example>

In the above example embodiment, the information terminal may allow the user to select an image of content displayed in websites such as social network services (including communication services), blogs, information posting sites, or a mobile application thereof, and allow the user to input the image as the image of a confirmation class.

Figure 31:
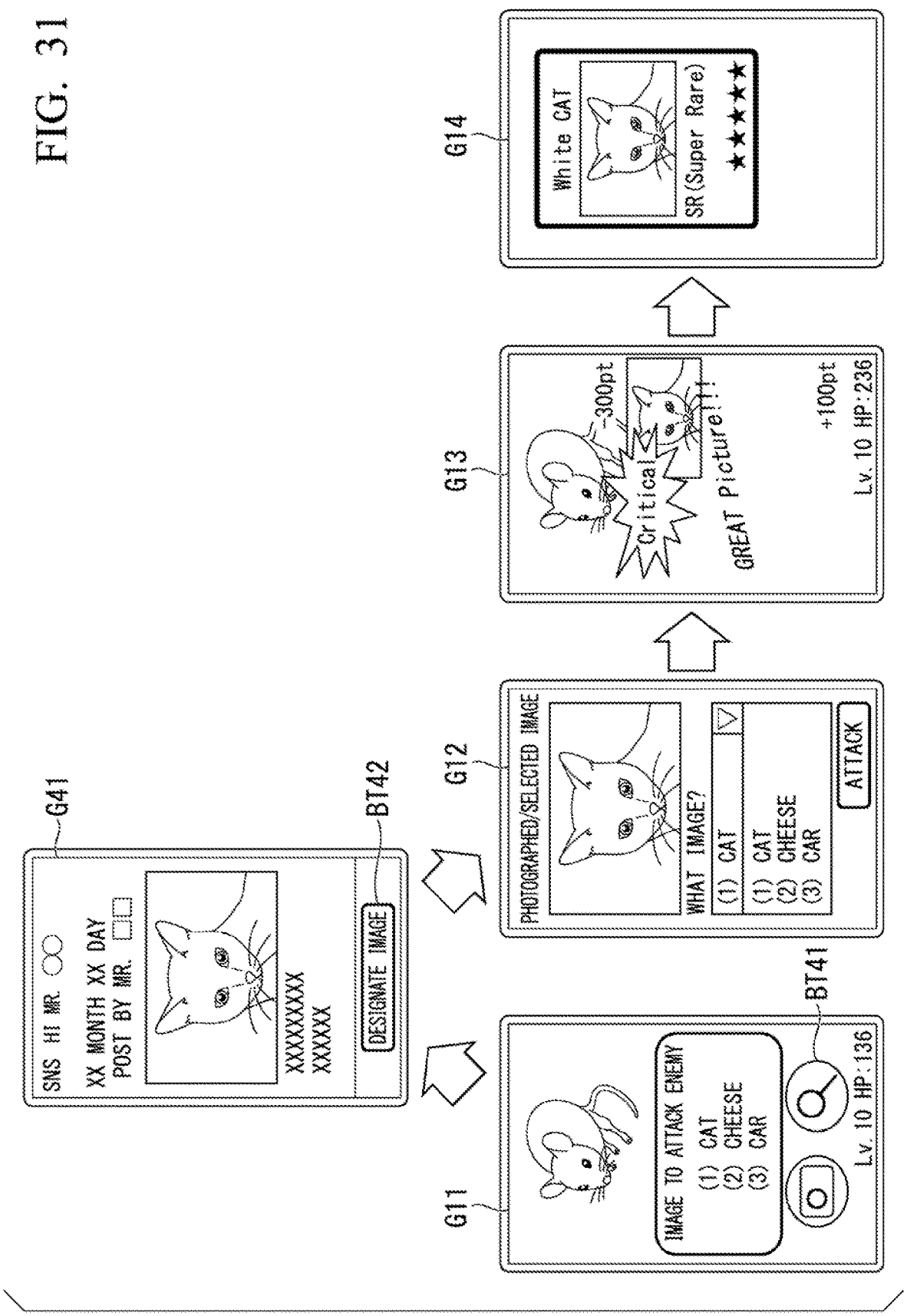
FIG. 31 is a schematic diagram showing another example of the screen flow according to the present example embodiment.

FIG. 31 is a schematic diagram showing another example of the screen flow according to the present example embodiment.

This diagram is an example of a screen flow displayed on the input/output unit I2 by the control unit P2 of the mobile terminal 2, which is an example of the information terminal. Comparing FIG. 31 and FIG. 1, the screen G1 and the button BT41 differ. Since the other displays are the same, descriptions thereof will be omitted.

When the button BT11 is touched by the user, the mobile terminal 2 (control unit P2) activates the web browser function and displays a website. The screen G41 is a screen on which this website is displayed. On the screen G41, the user can select a still image or a moving image by tapping the image. When a button BT42 is touched by the user while the image is selected, the mobile terminal 2 displays a screen G12 on which the image is selected.

As described above, the first system includes an information terminal. The information terminal includes the presenting unit, the input unit, and an information viewing unit (for example, the control unit P2, the information viewing unit 234) that allows the user to view information including an image by a network service. The presenting unit presents response information representing an object. The input unit receives as the explanatory information an input of the image in which the object is drawn, which is at least a part of the image specified by the user.

Thereby, the user is able to select an image of the network service as an image of the data set. Since the machine learning system can also acquire images of network services, it is possible to moreover acquire many data sets or various data sets, and so it is possible to more efficiently collect data used for machine learning.

The game app according to this example embodiment may be implemented as a function of a website such as a social network service, a blog, an information posting site, or an information retrieval site, or a mobile app thereof. For example, the mobile terminal 2 (game app, game control unit 232) may present a setting class when the user refers to a friend's post. For example, the mobile terminal 2 presents the classes "curry", "ice cream", and "car" when allows a friend's post to be referred to. The user selects an image from the post and provides these data sets with a confirmation class. Here, the mobile terminal 2 provides a function for the user to obtain permission to select an image from a friend, and when the permission is obtained, the data set may be acquired or a reward may be assigned.

The mobile terminal 2 (for example, the control unit P2) may select a confirmation category in accordance with a touch operation when the user is made to select an image. Touch operations include multiple taps, drags, or swipes. For example, the mobile terminal 2 selects a confirmed category according to the positions of the start point and the end point of the drag (drag direction).

Figure 32:
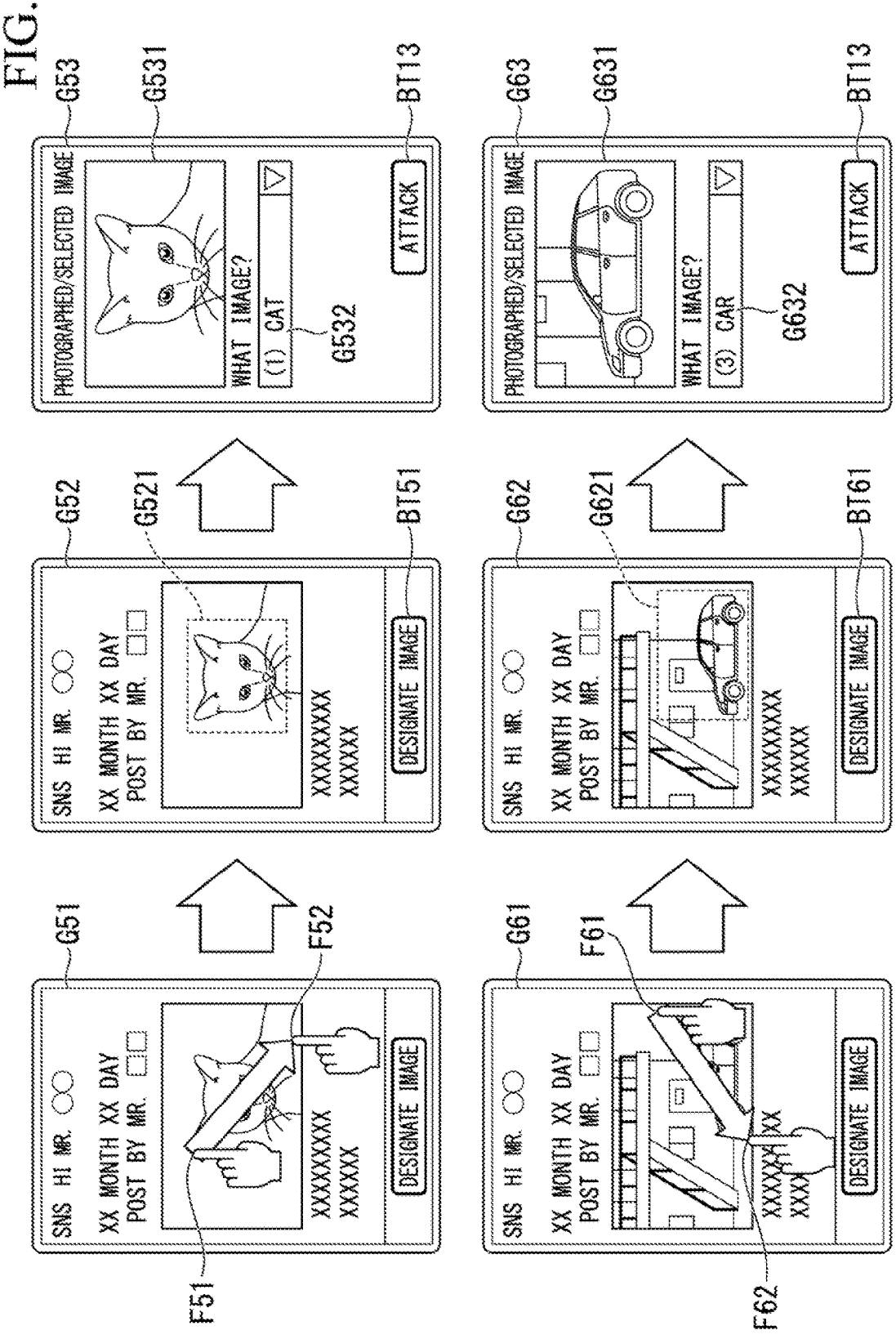
FIG. 32 is a schematic diagram showing another example of the screen flow according to the present example embodiment.

FIG. 32 is a schematic diagram showing another example of the screen flow according to the present example embodiment.

This figure is an example of a screen flow that the control unit P2 of the mobile terminal 2 displays on the input/output unit I2. The mobile terminal 2 has a preset class to be selected for each operation.

For example, when a drag operation is performed on the mobile terminal 2 diagonally downward to the right from the upper left to the lower right of the screen, the first class (cat) is selected, and when a drag operation is performed diagonally downward to the left from the upper right to the lower left of the screen, the third class (car) is selected.

A drag operation is performed on the screen G51 from a start point F51 to an end point F52, that is, from the upper left to the lower right of the screen and diagonally downward to the right. In this case, the mobile terminal 2 displays a rectangle having the start point F51 and the end point F52 as vertices as a selection area G521 selected by the user, as in a screen G52. When the button BT51 is touched by the user in the state of the selection area G521 being displayed, the mobile terminal 2 displays a screen G53. On the screen G53, the first class "cat" is selected and displayed as the initial value of the pull-down menu for selecting a class.

A drag operation is performed on the screen G61 from a start point F61 to an end point F62, that is, from the upper right to the lower left of the screen and diagonally downward to the left. In this case, the mobile terminal 2 displays a rectangle having the start point F61 and the end point F62 as vertices as a selection area G621 selected by the user, as in the screen G62. When the button BT61 is touched by the user in the state of the selection area G621 being displayed, the mobile terminal 2 displays the screen G63. On the screen G63, the third class "car" is selected and displayed as the initial value of the pull-down menu for selecting a class.

The button BT13 is the same as that in FIG. 1. Further, the start point and the end point may be specified by tapping twice.

In this way, the mobile terminal 2 selects and displays one of the pull-down menu options as an initial value according to the direction of the operation or the positional relationship between the two points on the screen. Thereby, the user can select the option to be input as the initial value with a simple operation.

Note that the mobile terminal 2 may select one or more radio buttons or check box options as initial values according to the direction of the operation or the positional relationship between two points on the screen.

Further, the mobile terminal 2 may display a shortcut menu on the screen G52 and screen G53 after the dragging, and as a shortcut menu, prioritize the class corresponding to the drag direction and display it in a selectable manner.

The mobile terminal 2 (for example, the control unit P2) may after the user has captured an image detect a face portion in the captured image, and perform mosaic processing such as blurring the detected face portion. As a result, the machine learning system Sys can acquire an image of a data set while considering the privacy protection of the user.

The learning server 4 (for example, control unit P4) may acquire sound data as explanatory information.

Figure 33:
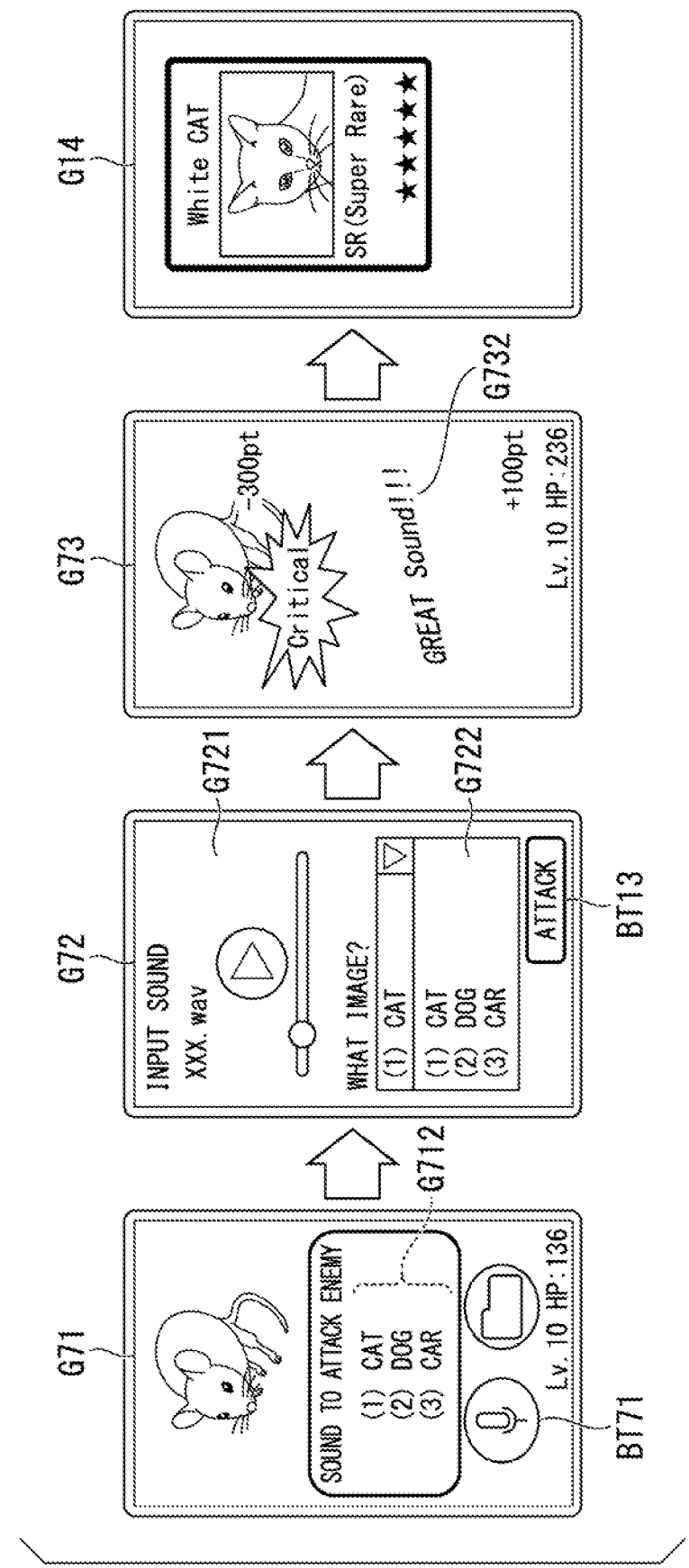
FIG. 33 is a schematic diagram showing another example of the screen flow according to the present example embodiment.

FIG. 33 is a schematic diagram showing another example of the screen flow according to the present example embodiment.

This diagram is an example of the screen flow that the control unit P2 of the mobile terminal 2 displays on the input/output unit I2. Comparing FIG. 33 and FIG. 1, the screens G71, G72, and a display 732 in screen G73 are different. Since the other displays are the same, descriptions thereof will be omitted.

Compared with the screen G11, the area 712 and the button BT71 in the screen G71 are different.

In the area G712, cat, dog, and car are displayed as image classes.

When the button BT71 is touched by the user, the mobile terminal 2 activates the microphone and displays a screen (not shown) on which sound can be recorded. On this screen, the user can record a sound by tapping the record button.

On the screen G72, sound data information (an example of "explanatory information") is displayed in an image G721. Sound data is sound data and can be played by tapping the play button.

The image G732 in the screen 73 is an image indicating that the sound of the image G721 is a sound that is highly evaluated ("GREAT Sound").

The mobile terminal 2 (for example, the control unit P2) may display guidance based on the recognition rate when an image has been captured by the imaging unit 214.

For example, the mobile terminal 2 recognizes an object from the captured image using the reference learned model, and acquires the recognition rate of that object. This recognition rate may be the recognition rate of the setting class or the recognition rate of the class in which the recognition rate is maximized. The mobile terminal 2 may transmit the image to the learning server 4, or may store the reference learned model in its own device.

The mobile terminal 2 performs a guidance display regarding positional relationship with the subject, zoom, or the orientation of the own device so that the recognition rate becomes high.

Figure 34:
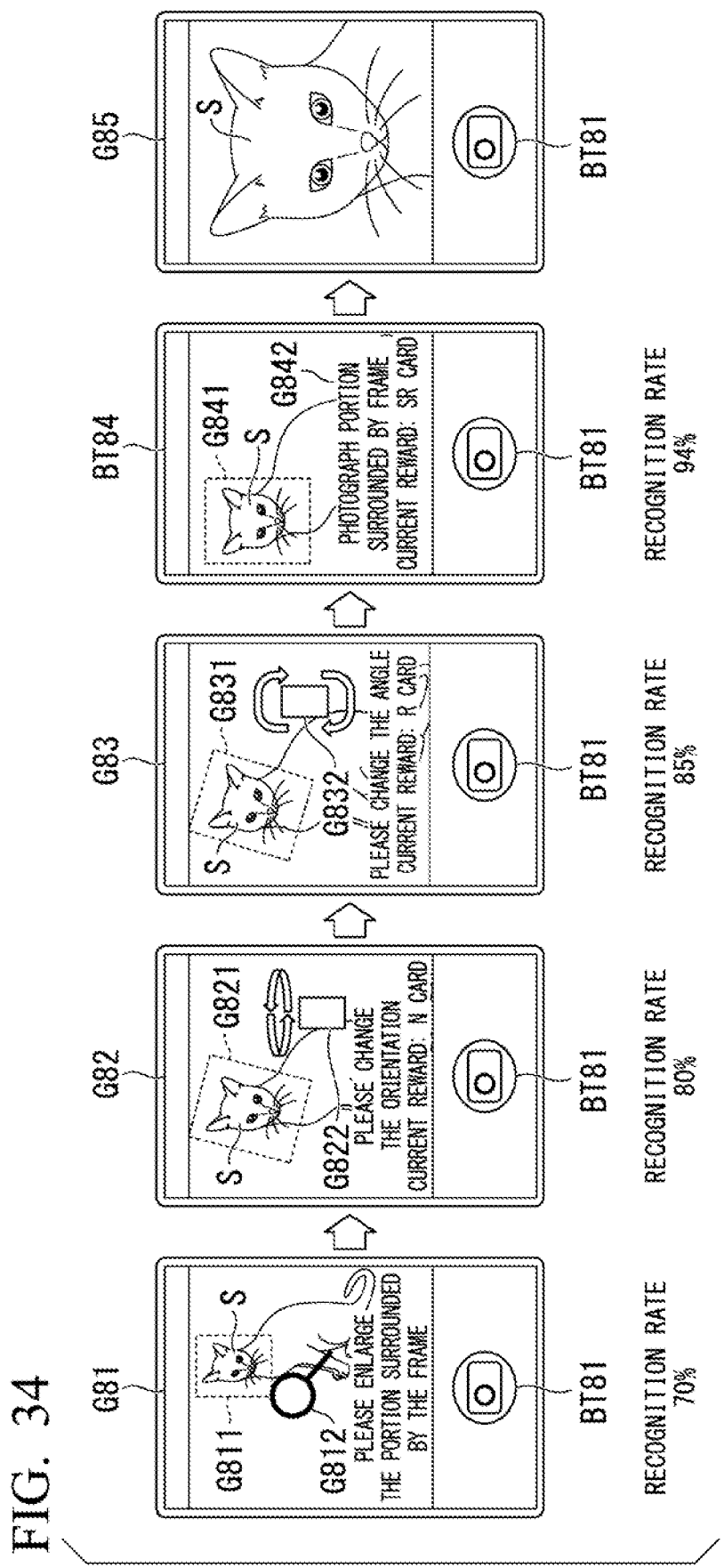
FIG. 34 is a schematic diagram showing another example of the screen flow according to the present example embodiment.

FIG. 34 is a schematic diagram showing another example of the screen flow according to the present example embodiment.

This diagram is an example of the screen flow that the control unit P2 of the mobile terminal 2 displays on the input/output unit I2. The subject S (cat) is recognized in the screen G81, and a frame G811 surrounding the subject S is displayed. The guidance display G812 guides enlarging the portion surrounded by the frame G811, that is, indicates one should approach the subject or use the zoom function of the camera (zoom in).

The screen G82 is displayed when the user follows the guidance display and enlarges the subject S. In the screen G82, the recognition rate has increased from the 70% of the screen G81 to 80%.

A frame G821 surrounding the subject S is displayed in the screen G82. The guidance display G822 performs guidance that the mobile terminal 2 should be rotated with respect to the subject S (rotation of the yaw axis). The guidance display G822 also indicates that a normal card is assigned as a reward according to the recognition rate. That is, when the captured image of the subject S is used as a data set in the state of the screen G82, a normal card is assigned as a reward.

The screen G83 is displayed when the user rotates the mobile terminal 2 with respect to the subject S according to the guidance display. In the screen G83, the recognition rate has increased from the 80% of the screen G82 to 85%.

In the screen G81, a frame G831 surrounding the subject S is displayed. A guidance display G832 indicates that the mobile terminal 2 should be rotated in another direction (rotation of the roll axis). The guidance display G832 also indicates that a rare card is to be assigned as a reward according to the recognition rate. That is, when the captured image of the subject S is used as a data set in the state of the screen G82, a rare card is assigned as a reward.

The screen G84 is displayed when the user rotates the mobile terminal 2 according to the guidance display. In the screen G84, the recognition rate has increased from the 85% of the screen G83 to 94%.

In the screen G84, a frame G841 surrounding the subject S is displayed. A guidance display G842 guides what should be photographed in this state. The guidance display G832 also indicates that a super rare card is to be assigned as a reward according to the recognition rate. That is, when the captured image of the subject S is used as a data set in the state of the screen G84, a rare card is assigned as a reward.

The screen G85 shows that a BT81 was tapped on the screen G84 and the frame G841 portion was photographed.

The management server 1 (control unit P1) may have a plurality of users other than those who provided the data set evaluate the image of the data set, and determine whether or not the data set is appropriate according to the evaluation result. Whether or not it is appropriate as a data set may be whether or not it is used for learning as a data set or whether or not it is delivered as a data set.

Figure 35:
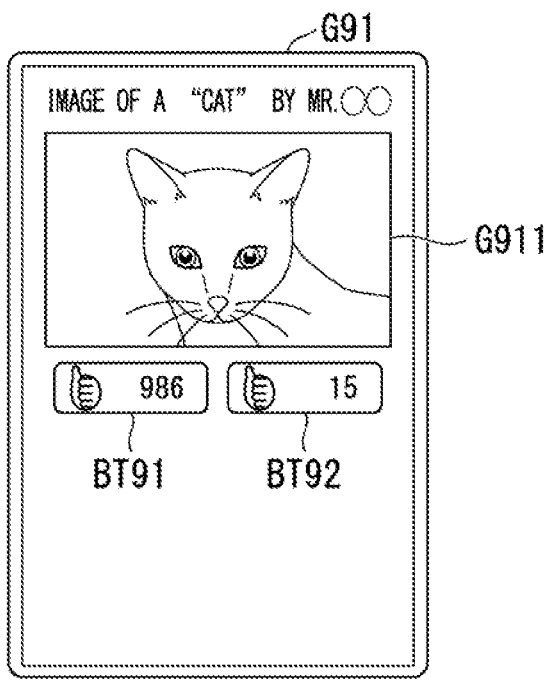
FIG. 35 is a schematic diagram showing another example of the screen according to the present example embodiment.

FIG. 35 is a schematic diagram showing another example of the screen according to the present example embodiment.

This diagram is an example of a screen displayed on the input/output unit I2 by the control unit P2 of the mobile terminal 2. In a screen G91, an image G911 acquired from a certain user and the confirmation class "cat" are displayed. On the screen G91, a like button BT91 and a dislike button BT92 are displayed. The button BT91 has been tapped by 986 other users (986 user IDs) and the button BT92 has been tapped by 15 other users.

That is, 986 other users have evaluated the image G911 as being an image of a "cat" or suitable as an image of a "cat". On the other hand, 15 other users have evaluated the image G911 as not being a "cat" image or being unsuitable as a "cat" image.

The management server 1 determines the image to be appropriate as a data set when the difference between the number of evaluations by the button BT91 and the number of evaluations by the button BT92 is equal to or greater than a threshold value.

In this way, the machine learning system Sys can acquire a data set including human evaluation. Further, even when an unspecified number of users can provide data sets, the machine learning system Sys can acquire appropriate data sets by the evaluations of other people.

The mobile terminal 2 (for example, the control unit P2) may display a sample of the image of a class (also referred to as a "sample image") in a screen presenting a class, a screen capable of taking a picture, or a screen capable of selecting a file or an image of content. This makes it easier for the user to recognize the image to be captured or selected. In addition, even a user who is unfamiliar with the written language representing a class, such as a young child or a foreigner, can recognize the image to be photographed or selected.

Since the user takes or selects a photo similar to the sample image, the size and orientation (angle) of the subject can be specified in the sample image. As a result, the machine learning system Sys has a high possibility of acquiring an image in which a subject of a desired size and orientation is depicted as a learning_data set.

FIG. 36 is a schematic diagram showing another example of the screen flow according to the present example embodiment.

This diagram is an example of the screen flow that the control unit P2 of the mobile terminal 2 displays on the input/output unit I2. In the screen Ga11, a cat and a car are respectively displayed as classes with text and sample images. Image Ga111 is a sample image of the class "cat". Further, in the screen Ga11, a button for activating the camera and a button for generating a function to select an image are arranged for each class. Thereby, the mobile terminal 2 can specify the class and the type of image (captured image or selected image) selected by the user. For example, when the button BTa11 has been touched by the user, the mobile terminal 2 activates the camera and displays the screen Ga12.

In the screen Ga12, the class selected by the user and the sample image Ga121 thereof are displayed. The image Ga122 is an image taken by the camera.

When the user taps a shooting button BTa121, the mobile terminal 2 stores the image shot at that time as an image file. After that, the mobile terminal 2 displays the image of the image file on a screen Ga13. When a button Bta131 on the screen Ga13 has been touched by the user, the mobile terminal 2 displays a screen Ga14 after performing the processes of steps S308 to S310 of FIG. 20.

On the screen Ga14, for example, it is displayed that 100 points have been assigned as points for an e-commerce site or a credit card. Further, on the screen Ga14, it is displayed that the total value of the points is 2,300 points. In addition, a button linked to a site for consuming points is displayed on the screen Ga14. For example, the button is a button linked to a site for consuming points and exchanging for goods. For example, the button is a button for consuming points and is linked to a shopping site.

The service log may be aggregated as follows (Step S209 in FIG. 16).

The management server 1 (service management unit 135) calculates the average value of the model recognition rate, the number of battles or the number of data sets with respect to each game factor (game ID, event ID, battle character ID, or reward ID) for each confirmation class of the data set. The management server 1 presents to the manager the game factor that maximizes the average value of the model recognition rate, the number of battles, or the number of data sets when collecting images of the same or similar confirmation class, and sets the factor as a game setting. In addition, in the aggregation of the service log, the recognition rate improvement value or recognition evaluation value may be used instead of or in addition to the model recognition rate.

In the data collection system SysA and the artificial intelligence system SysB, the provider, development entity, management entity, or operation entity of a system or service, or the application installed on the device of each system, the provider, the development entity, the management entity or the operation entity of the application differ. In the data collection system SysA and the artificial intelligence systems SysB-2 and B-M, the users (general users and companies), clients (general users' mobile terminals 2 and corporate control devices 6-2, 6-M), and networks (Internet NW and local area network L2 or direct connection) differ. The data collection system SysA and the artificial intelligence system SysB have different rewards for data sets (updating of variables or game objects and fees) for the data set. However, the present invention is not limited thereto, and the data collection system SysA and the artificial intelligence system SysB may be provided by the same entity. In that case, for example, information of the request source may not be available.

The management server 1, mobile terminal 2, game server 3, learning server 4, artificial intelligence server 5, and control device 6 described above have a computer system inside. Then, some or all of the processes of FIG. 5 described above are stored in a computer-readable recording medium in the form of a program, and the above processing is performed by the computer reading and executing this program. Here, the computer-readable recording medium refers to a magnetic disk, a magneto-optical disk, a CD-ROM, a DVD-ROM, a semiconductor memory, or the like. Further, this computer program may be distributed to a computer via a communication line, and the computer receiving the distribution may execute the program.

It should be noted that by recording a program for realizing the function of the machine learning system Sys in FIG. 2 in a computer-readable recording medium, loading the program recorded in the recording medium into the computer system and executing the program, various processes may be performed. The term "computer system" as used herein includes hardware such as an OS and peripheral devices. Further, the "computer system" shall also include a WWW system provided with a homepage providing environment (or display environment). Further, the "computer-readable recording medium" refers to a portable medium such as a flexible disk, a magneto-optical disk, a ROM, or a CD-ROM, or a storage device such as a hard disk built in a computer system. Furthermore, a "computer-readable recording medium" shall include a medium that holds a program for a given period of time, such as a volatile memory (RAM) inside a computer system that serves as a server or client when a program is transmitted via a network such as the Internet or a communication line such as a telephone line.

Further, the program may be transmitted from a computer system in which this program is stored in a storage device or the like to another computer system via a transmission medium or by transmission waves in a transmission medium. Here, "transmission medium" for transmitting the program refers to a medium having a function of transmitting information, such as a network (communication network) such as the Internet or a communication line (communication line) such as a telephone line. Further, the above program may be for realizing a part of the above-mentioned functions. Further, a so-called differential file (differential program) may be used, which can realize the above-mentioned functions in combination with a program already recorded in the computer system.

INDUSTRIAL APPLICABILITY

One aspect of the present invention can be used, for example, in a system or device that utilizes artificial intelligence, or in a system or device that collects data. Artificial intelligence can be used in a variety of devices.

REFERENCE SYMBOLS

Sys . . . Machine learning system; SysA . . . Data collection system; SysB, SysB-1~B-M . . . Data collection system; 1 . . . Management server; 2, 2-1~2-M . . . Mobile terminal; 3 . . . Game server; 4 . . . Learning server; 5, 5-1~5-M . . . Artificial intelligence server; 6, 6-1~6-M . . . Control device; I, I1, I2, I3, I4, I5, I6 . . . Input/output unit; M, M1, M2, M3, M4, M5, M6, M . . . Storage unit; P, P1, P2, P3, P4, P5, P6 . . . Control unit; 111 . . . Communication unit; 121 . . . Order information storage unit; 122 . . . Game setting storage unit; 123 . . . Learning setting storage unit; 124 . . . Status information storage unit; 125 . . . Collection information storage unit; 126 . . . Service log storage unit; 131 . . . Order management unit; 132 . . . Setting update unit; 133 . . . Game setting unit; 134 . . . Learning setting unit; 135 . . . Service management unit; 136 . . . Delivery management unit; 211 . . . Communication unit; 212 . . . Input unit; 213 . . . Output unit; 214 . . . Imaging unit; 215 . . . Sensor unit; 221 . . . Operation storage unit; 222 . . . Game storage unit; 223 . . . Data storage unit; 231 . . . Operation unit; 232 . . . Game control unit; 233 . . . Imaging control unit; 234 . . . Information viewing unit; 235 . . . File management unit; 236 . . . Display control unit; 311 . . . Communication unit; 321 . . . Operation storage unit; 322 . . . Management app storage unit; 331 . . . Operation unit; 332 . . . Management app control unit; 2321 . . . Event management unit; 2322 . . . Class presenting unit; 2323 . . . Image acquisition unit; 2324 . . . Data set providing unit; 2325 . . . Variable value updating unit; 232 . . . Reward assigning unit; 3321 . . . Event notification unit; 3322 . . . Class management unit; 3323 . . . Data set reception unit; 3324 . . . Determination unit; 3325 . . . Reward determination unit; 3326 . . . Log generation unit; 411 . . . Communication unit; 421 . . . Learning setting storage unit; 422 . . . Reference storage unit; 423 . . . Collected data storage unit; 424 . . . Collection log storage unit; 431 . . . Learning setting unit; 432 . . . Data acquisition unit; 433 . . . Learning unit; 434 . . . Evaluation unit; 435 . . . Reporting unit; 4231 . . . Additional learned model storage unit; 4232 . . . First data set storage unit; 4233 . . . Second data set storage unit; 4234 . . . Third data set storage unit; 511 . . . Communication unit; 521 . . . Operation storage unit; 522 . . . App storage unit; 531 . . . Operation unit; 532 . . . Equipment control unit; 533 . . . Learning unit; 611 . . . Communication unit; 612 . . . Input unit; 613 . . . Output unit; 614 . . . Imaging unit; 615 . . . Sensor unit; 616 . . . Drive unit; 621 . . . Operation storage unit; 622 . . . App storage unit; 631 . . . Operation unit; 632 . . . App control unit; 633 . . . Imaging control unit; H11 . . . Communication module; H12 . . . Connection module; H21 . . . Pointing device; H22 . . . Keyboard; H23 . . . Display; H3 . . . Button; H41 . . . Microphone; H42 . . . Speaker; H51 . . . Camera; H52 . . . Sensor; H6 . . . Power supply; H7 . . . Drive; H8 . . . Memory; H9 . . . Processor

What is claimed is:

1. A machine learning system comprising a first system and a second system, wherein
the first system comprises:
at least one first processor configured to execute first instructions to present response information for machine learning, the response information being provided by a user; and
an interface configured to receive explanatory information for the response information from the user,
the at least one first processor is configured to execute the first instructions to:
acquire the explanation information and the response information;
evaluate a classification accuracy of the response information by the explanatory information, based on a data set of an input variable based on the explanatory information and an output variable based on the response information, and a predetermined learned model;
assign to the user a reward in accordance with the evaluation; and generate history information in which the response information, the evaluation result, and the reward are associated, and the second system comprises:
a memory configured to store a learned model in which machine learning has been performed based on at least one of the data set; and
at least one second processor configured to execute second instructions to:
output the response information in response to the explanatory information been input, based on the learned model stored in the memory,
wherein evaluating the classification accuracy comprises determining the classification accuracy based on the predetermined learned model and the learned model in which the machine learning has been performed based on the at least one of the data set.

2. The machine learning system according to claim 1, wherein
the at least one first processor is configured to execute the first instructions to present response information representing an object,
the interface is configured to receive an image in which the object is drawn as the explanatory information,
the at least one first processor is configured to execute the first instructions to evaluate classification accuracy of the response information by the image, and
the at least one second processor is configured to execute the second instructions to output, in response to an image in which an object is drawn being input, response information representing the object.

3. The machine learning system according to claim 1, wherein
the at least one first processor is configured to execute the first instructions to present the response information on a display of each information terminal of a plurality of users, and
the at least one first processor is configured to execute the first instructions to acquire the explanatory information received by the interface of each of the information terminals.

4. The machine learning system according to claim 1, wherein
the first system comprises a plurality of information terminals and a server connected to each of the plurality of information terminals via a network,
an application program provided via the network causes each of the information terminals to present the response information and receive the explanatory information,
the server is configured to acquire the explanatory information and the response information from each of the information terminals of a plurality of users via the network.

5. The machine learning system according to claim 1, wherein
the at least one first processor is configured to execute:
manage request source information indicating a request source that requests acquisition of the explanatory information and the response information, the request source being related to the second system; and
manage a delivery status to the request source indicated by the request source information, the delivery status being a delivery status of the data set,
wherein the memory is configured to store a learned model in which machine learning has been performed based on at least one of the delivered data set.

6. The machine learning system according to claim 1, wherein
the at least one first processor is configured to execute the first instructions to present a plurality of pieces of response information comprising the response information,
the interface is configured to receive the response information selected by the user and explanatory information for the response information, and
the at least one first processor is configured to execute the first instructions to acquire the explanatory information and the response information for the plurality of pieces of response information.

7. The machine learning system according to claim 1, wherein
the first system comprises an information terminal,
the information terminal is configured to present the response information and receive the explanatory information, and comprises a camera,
the information terminal is configured to present response information representing an object, and
the information terminal is configured to capture an image in which the object is drawn as the explanatory information, by the camera.

8. The machine learning system according to claim 1, wherein
the first system comprises an information terminal,
the information terminal is configured to present the response information, receive the explanatory information, and allow the user to view information including an image by a network service,
the information terminal is configured to present response information representing an object, and
the information terminal is configured to receive the image in which the object is drawn as the explanatory information, the image being at least a portion of the image designated by the user.

9. The machine learning system according to claim 1, wherein
a game program causes each of a plurality of information terminals to execute:
presenting the response information at an in-game event;
receiving an image for the response information as the explanatory information in order for the user to advance the game; and
updating a variable in the game or assigning a game object, as a reward of the game.

10. The machine learning system according to claim 1, wherein the at least one first processor is configured to execute the first instructions to determine, based on classification accuracy of response information in a predetermined learned model, response information to be presented.

11. An information terminal comprising:
at least one processor configured to execute instructions to present response information for machine learning, the response information being provided by a user; and
an interface configured to receive explanatory information for the response information from the user,
wherein the at least one processor is configured to execute the instructions to assign to the user a reward in accordance with an evaluation using the response information and the explanatory information,
wherein the evaluation is performed based on:
a predetermined learned model for evaluating a classification accuracy of the response information by the explanatory information; and a learned model in which machine learning has been performed based on at least one of data set of an input variable based on the explanatory information and an output variable based on the response information.

12. An information processing method comprising:
presenting response information for machine learning, the response information being provided by a user;
receiving explanatory information for the response information from the user; and
assigning to the user a reward in accordance with an evaluation using the response information and the explanatory information,
wherein the evaluation is performed based on:
- a predetermined learned model for evaluating a classification accuracy of the response information by the explanatory information; and
- a learned model in which machine learning has been performed based on at least one of data set of an input variable based on the explanatory information and an output variable based on the response information.

* * * * *